United States Patent
Hoffman

(10) Patent No.: US 11,409,681 B2
(45) Date of Patent: Aug. 9, 2022

(54) COMPUTER SYSTEM COMMUNICATION VIA SIDEBAND PROCESSOR

(71) Applicant: PayPal, Inc., San Jose, CA (US)

(72) Inventor: Abraham Hoffman, Mesa, AZ (US)

(73) Assignee: PayPal, Inc., San Jose, CA (US)

( * ) Notice: Subject to any disclaimer, the term of this patent is extended or adjusted under 35 U.S.C. 154(b) by 19 days.

(21) Appl. No.: 17/013,088

(22) Filed: Sep. 4, 2020

(65) Prior Publication Data

US 2022/0075744 A1 Mar. 10, 2022

(51) Int. Cl.
*G06F 13/40* (2006.01)
*G06F 13/38* (2006.01)
*G06F 9/38* (2018.01)
*G06F 8/60* (2018.01)

(52) U.S. Cl.
CPC ........ *G06F 13/4004* (2013.01); *G06F 9/3877* (2013.01); *G06F 13/382* (2013.01); *G06F 8/60* (2013.01); *G06F 2213/0042* (2013.01); *G06F 2213/3808* (2013.01)

(58) Field of Classification Search
CPC ..... G06F 8/60; G06F 8/61; G06F 8/65; G06F 8/656; G06F 8/70; G06F 13/4004; G06F 13/382; G06F 9/3877; G06F 2213/0042; G06F 2213/3808
USPC ........................................................ 717/168
See application file for complete search history.

(56) References Cited

U.S. PATENT DOCUMENTS

| | | | |
|---|---|---|---|
| 8,549,205 B1 | 10/2013 | Harriman et al. | |
| 8,959,576 B2 | 2/2015 | Sastry et al. | |
| 8,977,797 B2 | 3/2015 | Chu | |
| 9,430,644 B2 | 8/2016 | Aguayo Gonzalez et al. | |
| 9,804,832 B2* | 10/2017 | Yu | H04L 67/06 |
| 10,630,501 B2 | 4/2020 | Ansari et al. | |
| 2002/0092008 A1* | 7/2002 | Kehne | G06F 8/65 717/168 |
| 2005/0223292 A1* | 10/2005 | Lee | G06F 8/60 714/35 |

(Continued)

OTHER PUBLICATIONS

International Search Report and Written Opinion in PCT Appl. No PCT/US2021/048667 dated Dec. 7, 2021, 8 pages.

(Continued)

*Primary Examiner* — Brian T Misiura

(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to a method that includes monitoring, by a sideband processor, a plurality of operating conditions of a computer system using a first set of commands. This first set of commands are sent utilizing a particular command protocol over a particular communication bus. In addition, the sideband processor may be modified to support a second set of commands. The sideband processor may receive data for a particular device in the computer system. The sideband processor may modify a first command of the first set of commands to include a second command of the second set of commands. This second command may include an address associated with the particular device and at least a portion of the data. The sideband processor may then send the modified first command to a controller hub using the particular command protocol over the particular communication bus.

19 Claims, 12 Drawing Sheets

(56) References Cited

U.S. PATENT DOCUMENTS

| | | |
|---|---|---|
| 2010/0023705 A1 | 1/2010 | Sutardja |
| 2011/0264850 A1 | 10/2011 | Booth et al. |
| 2012/0030452 A1 | 2/2012 | Asnaashari |
| 2014/0344797 A1* | 11/2014 | Rajagopalan ............. G06F 8/61 |
| | | 717/169 |
| 2017/0285174 A1 | 10/2017 | Zhu et al. |
| 2022/0075611 A1* | 3/2022 | Hoffman ................ G06F 13/102 |
| 2022/0075615 A1* | 3/2022 | Hoffman ................ G06F 13/20 |

OTHER PUBLICATIONS

Mokha, "Single Sideband Modulation Using TMS32020 Digital Signal Processor," Diss. University of New South Wales, Apr. 1988; entire document.

* cited by examiner

FIG. 2 command 113:
| frame start 216 | command of first set 218 | address of first command 222 | data (if applicable) 224 | frame end 226 | modified command 114:
| frame start 216 | command of first set 218 | address of first command 222 | data (if applicable) 224 | size 232 | command of 2nd set 234 | address of 2nd command 236 | second data 238 | sequence number 242 | frame end 226 |

_1000_

Executing, by a processor of a computer system, a particular operating system (OS), from a system memory coupled to the processor.
_1010_

Receiving, by a sideband processor of the computer system via a network, instructions for an updated version of the OS.
_1020_

While the processor executes the particular OS, sending, by the sideband processor to a controller hub, a series of commands that cause the controller hub to store the received instructions into one or more regions of the system memory.
_1030_

Causing, by the sideband processor, the processor to switch, without rebooting, from executing the particular OS to executing the updated version of the OS.
_1040_

*FIG. 10*

COMPUTER SYSTEM COMMUNICATION VIA SIDEBAND PROCESSOR

BACKGROUND

Technical Field

This disclosure relates generally to computer system operation, and more particularly to communication between components of a computer system in order to facilitate installation of software and firmware.

Description of the Related Art

Multi-user entities may rely on enterprise computing systems to provide a computing infrastructure for users. An enterprise computing system may include one or more computer systems to provide server computing power and one or more databases to provide services for these users. Each of the computer systems commonly includes a motherboard onto which a processor and, in some cases, one or more peripherals or other devices are installed. The processor provides computing power for the computer system and the one or more peripherals may include, for example, graphics coprocessors, audio coprocessors, network interfaces, storage interfaces, and the like. The processor executes an operating system (OS) to manage various processes that are also executed on the computer system, as well as managing data input, data output, data storage and other tasks that impact circuits that are coupled to the processor. In a similar manner, the various peripherals may utilize drivers that govern operations performed by the peripherals.

An enterprise computing system for a particular entity may be implemented using anywhere from one single computer system to hundreds or even thousands of computer systems (e.g. coupled together in a server data center). Over time, an OS and/or driver may have an updated version that enables new features, fixes known bugs, increases computing bandwidth, and such. Installing a new OS and/or driver on a computer system may require taking the computer system offline such that it is not contributing to the services provided by the particular entity. Such down time may potentially cost the entity revenue and/or efficiency from services that cannot be rendered while the computer system is down. Techniques discussed herein describe improved methods for performing faster updates and management of computer systems of all kinds, though these techniques may be especially beneficial in larger enterprise computing environments.

BRIEF DESCRIPTION OF THE DRAWINGS

FIG. 2 shows a block diagram of an embodiment of a command protocol used by a sideband processor.

FIG. 10 shows a flow diagram of an embodiment of a method for updating an operating system of a processor installed on a computer system that implements a sideband command protocol.

DETAILED DESCRIPTION

Figure 1:
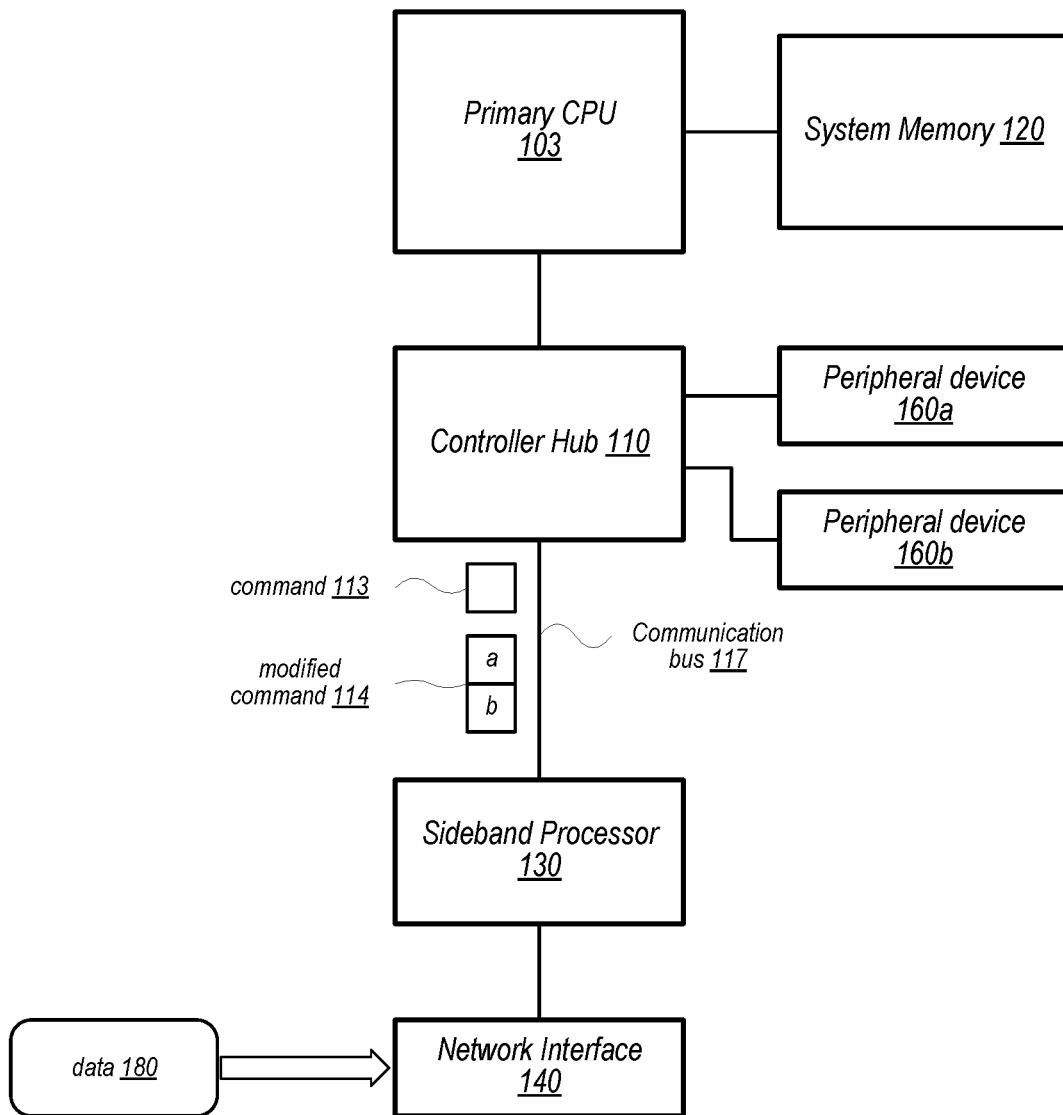
FIG. 1 illustrates a block diagram of an embodiment of a computer system that includes a sideband processor.

To improve speed and efficiency for monitoring status of computer systems included in a computer system, motherboards for some computer systems may include a sideband processor. Such sideband processors may provide various types of information for a given motherboard, such as operating temperature, voltage levels of power supply signals, operational status of peripheral devices installed on, or otherwise coupled to, the motherboard, memory usage of volatile and non-volatile memories coupled to the motherboard, and other similar types of data. The sideband processor gathers the various types of information by sending memory read requests to a variety of registers and/or memories. This sideband processor may be accessible by system administrators in various embodiments.

The system administrators may have a need or desire to update a version of an operating system (OS) of one or more computers, or update a driver of a particular device included in the one or more computers. Such updates may enable new features, fix known bugs, increase computing bandwidth, and such. Traditional methods for implementing such updates may require taking a computer being updated offline for a significant amount of time. In some cases, the updates may require a system administrator to operate the computer being updated in person, or to utilize a primary network channel of the computer, reducing a communication bandwidth of the computer while the new OS and/or drivers are being transferred.

The inventor has recognized that, in addition to monitoring operating conditions of a computer system, a modified sideband processor may be used for exchanging additional information with a computer system, including, for example, using the sideband processor for downloading OS software and/or driver firmware for the computer system. Techniques are disclosed herein for implementing a modified command protocol for a sideband processor that allows both read and write access to processors, memories, and peripheral devices coupled to a same computer system as the sideband processor. Such a command protocol may allow the sideband processor to issue a series of commands to monitor a plurality of operating conditions of the computer system. In response to receiving data to be sent to a particular device (e.g., a memory circuit or peripheral device), the sideband processor may modify one or more of the series of commands to include a second command for storing at least a portion of the received data to a particular address associated with the particular device. The sideband processor may then send the modified command to perform both the original one of the series of commands along with the second command to store the portion of the received data.

In various embodiments, such a command protocol may enable installation of an updated version of an operating system (OS) for a processor and/or an updated version of a driver for a peripheral device while allowing the processor and peripheral device to operate during at least a portion (e.g. all or substantially all) of the installations. In an example discussed below, an updated version of an OS may be received by the sideband processor while the processor continues to operate. The sideband processor may install the updated version into a portion of memory that is separate from a different portion in which a current version of the OS is installed. The processor continues to execute the current OS while the sideband processor sends commands to install the updated version of the OS into the different portion of the memory. After the updated version has been installed, the sideband processor may send a command to the processor that causes the processor to cease execution of the current version and begin execution of the updated version of the OS. This may be accomplished without performing a complete reboot of the computer system. In some embodiments, a partial reboot of the computer system may be performed to initialize one or more circuits of the computer system. Such partial reboots, however, may be performed in less time than a complete reboot.

Similarly, an updated version of a driver for a peripheral device may be installed. For example, the sideband processor may receive an updated version of a driver. To install the updated version of the driver, the sideband processor sends a notification to the processor indicating that the updated version is ready to be installed, and causing the processor to suspend using the peripheral device. The sideband processor may then send commands to install the updated version of the driver while use of the peripheral device is suspended, but the processor otherwise continues to operate. After the updated version of the driver has been installed, the sideband processor sends a notification to the processor that the updated version of the driver has been installed. In response, the processor may resume use of the peripheral device.

Embodiments of a command protocol for sideband controller are presented below. In addition, examples of systems utilizing this sideband command protocol are provided, including an embodiment in which an OS is updated for a computer system. Another embodiment is presented in which a driver for a peripheral device in a computer system is updated. A further embodiment illustrating how both cases (OS update and driver update) may be handled is also presented. Two cases illustrating system memory usage are shown, as well as an example of the command and response flow to and from the sideband processor. Several embodiments of methods for performing the disclosed techniques are shown. Furthermore, one example of a computer system on which the disclosed techniques may be implemented is presented.

Sideband Command Protocol

A block diagram of an embodiment of a computing system is illustrated in FIG. 1. As shown, computer system 100 includes primary central processing unit (CPU) 103, controller hub 110, system memory 120, sideband processor 130, network interface controller 140, and peripheral devices 160a and 160b (collectively peripheral devices 160). Computer system 100 may be any suitable type of computer system, such as a desktop computer, a laptop computer, a rack-mounted server computer, a workstation in an enterprise computer system, and the like.

Primary CPU 103, as illustrated, executes an operating system and other software processes that may be accessed via system memory 120 or other memory coupled to computer system 100. Primary CPU 103 is a central processing unit (CPU) that includes one or more processing cores that are each configured to support a respective instruction set architecture (ISA), such as Intel x86 or ARMv8. Primary CPU 103 is configured to interface with controller hub 110 and system memory 120. In some embodiments, primary CPU 103 is coupled to a motherboard using a hardware socket that is configured to couple a CPU integrated circuit (IC) to computer system 100. For example, such a socket may be a land grid array (LGA) socket such as an LGA 1150, LGA 1151, or Socket SP3. The socket allows for primary CPU 103 to be physically installed into computer system 100.

Controller hub 110, in the embodiment shown, provides an interface between primary CPU 103 and peripheral devices 160 included on computer system 100. For example, controller hub 110 may include one or more Peripheral Component Interconnect Express (PCIe) bus interfaces for communicating to compatible peripheral devices 160. Computer system 100 may include any suitable number of PCIe sockets, allowing for up to a corresponding number of PCIe compatible peripheral devices to be physically installed in computer system 100, communicating via controller hub 110. Controller hub 110 may support additional interface standards, such as universal serial bus (USB), ethernet, Serial AT Attachment (SATA), and the like. In some embodiments, some or all of the functions of controller hub 110 may be included within primary CPU 103. In other embodiments, functions of controller hub 110 may be split into two or more ICs, such as a northbridge controller and a southbridge controller.

System memory 120 is used by primary CPU 103 to store instructions and other data associated with an OS as well as other processes while being executed by primary CPU 103. System memory 120 includes volatile memory such as static random-access memory (SRAM) and/or dynamic random-access memory (DRAM). In some embodiments, system memory 120 may include virtual RAM such as may be implemented using non-volatile memory, e.g., a hard-disk drive, a solid-state drive, embedded flash memory, and the like. Some or all of system memory 120 may be included on a different circuit board than primary CPU 103 and then installed into computer system 100 using, for example, dual-inline memory module sockets.

Peripheral devices 160, as illustrated, include devices that increase capabilities of computer system 100 by offloading tasks that might otherwise be performed by primary CPU 103, and/or performing additional tasks that primary CPU 103 or other hardware within the system may not otherwise be capable of performing. In various embodiments, peripheral devices 160 may correspond to any suitable type of device, such as a graphics coprocessor, audio coprocessor, network interface, wireless interface, and the like. Peripheral devices 160 may be installed during manufacturing of computer system 100, or installed after manufacturing, for example, by using a socket that is included in a motherboard of computer system 100. Although two peripheral devices are illustrated, any suitable number of peripheral devices may be included in computer system 100, limited for example, by a number of available PCIe sockets.

Sideband processor 130 is a processor included in computer system 100 and used to monitor operation of various circuits installed in computer system 100 and send status information to, for example, a computer system used by a system administrator, according to various embodiments. Sideband processor 130 may be implemented, in various embodiments, as a microcontroller or other type of system-on-chip processor, and, in some embodiments, may be a motherboard management controller. As shown, sideband processor 130 includes network interface controller 140 that is separate from a network connection used by primary CPU 103. Network interface controller 140 allows sideband processor 130 to communicate with the system administrator, enabling the system administrator to request particular status information and allowing sideband processor 130 to respond with the requested information. Sideband processor 130 may be capable of monitoring, for example, any one or more of: an operating temperature of computer system 100, a voltage level of one or more power supply nodes, a current workload of primary CPU 103, an amount of data traffic in progress through peripheral devices 160, an amount of system memory 120 that is currently available, and the like.

To perform monitoring operations, sideband processor 130 may issue a series of commands from a first set of commands, including, e.g., command 113, to controller hub 110. These commands of the first set may cause controller hub 110 to access various circuits on computer system 100 in order to retrieve operating conditions being monitored by sideband processor 130. Each of the first set of commands may include any one or more of an identifier of a circuit to be accessed (e.g., a PCIe address), a command type (e.g., read or write), an address of a memory location or a register ID to be read or written, data to be written (in the case of a write command), and the like. In some embodiments, this command structure may be determined by a third-party entity, such as a manufacturer of computer system 100, or a manufacturer of a motherboard used by computer system 100. The first set of commands accessible to a user of computer system 100, such as a system administrator, may be limited to particular circuits included in computer system 100, and in some embodiments, to particular addresses within a given circuit.

Sideband processor 130, in some embodiments, is configured to wait for a response, from controller hub 110, to a first command of a first set of commands before sending a second command. Accordingly, to get a current operating temperature and a current voltage level of power supplies, sideband processor 130 sends a first command to determine a current operating temperature, and then waits for a first response with the current operating temperature before sending a second command to determine a voltage level of power supplies.

In other embodiments, sideband processor 130 may send more than one command of the first set without waiting for responses in between. In such embodiments, controller hub 110 is configured to send responses to commands in an order corresponding to an order the commands are received from sideband processor 130. For example, if sideband processor 130 sends a first command to determine a current operating temperature, followed by a second command to determine a voltage level of power supplies, and then followed by a third command to determine a current level of system memory usage, then controller hub 110 send a first response with the current operating temperature, followed by a second response with the power supply voltage levels, and then by a third response with the current system memory usage.

To provide a wider range of commands with more flexibility, and to open access to circuits installed in computer system 100 during and after manufacturing of computer system 100, sideband processor 130, as shown, is further configured to send a second set of commands using modified commands, such as modified command 114, to controller hub 110, including commands to read and write to memory locations in system memory 120, registers and/or memory included in peripheral devices 160, and in some embodiments, at least a portion of registers in primary CPU 103.

Sideband processor 130 utilizes a command protocol that allows the second set of commands to be sent without waiting for a response from controller hub 110 between consecutive commands. Utilizing this command protocol, sideband processor 130 is configured to send, via communication bus 117, a series of commands of the first set of commands (including, e.g., command 113) to monitor one or more operating conditions of computer system 100. This series of commands may, for example, allow sideband processor 130 to perform functions of a motherboard management controller, thereby collecting information related to operating conditions such as operating temperatures, voltage levels of one or more power supply nodes on the motherboard, information regarding states of peripheral devices 160, system memory 120, and/or primary CPU 103, and other similar types of information.

As illustrated, sideband processor 130 is further configured to receive, via network interface controller 140, data 180 for a particular one (e.g., peripheral device 160a) of the one or more peripheral devices 160. Data 180 correspond to any of a variety of types of information applicable to peripheral device 160a. Data 180 may be configuration information used to put peripheral device into a particular operational state, may be a new driver (in part or in whole) for operating peripheral device 160a, may be information to be processed by peripheral device 160a, may include commands to request information from peripheral device 160a, and so forth. Sideband processor 130, as shown, receives data 180 via network interface controller 140 from, for example, a system administrator, programmer, or other user with access to network interface controller 140. Data 180 may be subdivided into a plurality of portions, for example, if data 180 is too large to be included in a single one of the second set of commands. Each portion, accordingly, would be a suitable size for transferring with one command.

Sideband processor 130 is further configured to modify a pending particular command of the series of commands, to include a subsidiary command of the second set of commands. As shown, modified command 114 includes commands labeled a and b. Command 114a may be the pending particular command of the first set, while command 114b is the subsidiary command of the second set. While sending a given command of the series of commands to controller hub 110, sideband processor 130 may have one or more subsequent commands of the first set, including pending particular command 114a, generated and queued in an interface circuit for transmission over communication bus 117. To include the subsidiary command 114b, sideband processor 130 uses, for example, a direct memory access circuit (DMA) to send subsidiary command 114b to the interface circuit during the sending of pending particular command 114a. After being incorporated into modified command 114, subsidiary command 114b includes an address associated with peripheral device 160a and at least a portion of data 180.

Sideband processor 130 is further configured to, after particular command 114a has been modified to include subsidiary command 114b, send via communication bus 117, modified command 114 to controller hub 110 using the particular command protocol. Controller hub 110 receives modified command 114, and performs particular command 114a and subsidiary command 114b. Particular command 114a and subsidiary command 114b may be performed independently on different portions of computer system 100. In such cases, sideband processor 130 may, at a first time, receive a first response to particular command 114a from controller hub 110. At a second time after the first time, sideband processor 130 may receive a second response to subsidiary command 114b from controller hub 110. Since the commands of the first set are related to obtaining information regarding operating conditions, commands of the first set may typically be performed more quickly that commands of the second set, which may typically involve transferring data to a particular device in computer system 100 (e.g., system memory 120, peripheral devices 160, etc.). Due to the differences in performance times, responses associated with the commands of the first and second sets of commands may be received at different points in time.

To maintain traceability of the second set of commands that may take longer to perform, sideband processor 130, in some embodiments, includes an identification value in subsidiary command 114b, such as a sequence number relative to other sent subsidiary commands. Controller hub 110 is configured to include this identification value in responses sent to sideband processor 130 regarding the performed subsidiary commands. Sideband processor 130 is further configured to determine that the second response, received at the second time, corresponds to subsidiary command 114b using the identification value. For example, sideband processor 130 may keep a table with entries corresponding to commands that have been sent, but for which responses have not been received. After receiving a response corresponding to a particular entry, the corresponding entry may be cleared.

In some embodiments, to transfer data 180 to peripheral device 160a, subsidiary command 114b causes the portion of data 180 to be stored in system memory 120. Instead of transferring data 180 directly to peripheral device 160a, data 180 is first transferred to system memory 120 using one or more of the second set of commands. After at least a portion of data 180 has been stored in system memory 120, sideband processor 130 is further configured to cause peripheral device 160a to copy the portion of data 180 from system memory 120. To accomplish this, sideband processor 130 may modify a pending different command of the first set of commands, to include a different subsidiary command of the second set of commands. Sideband processor 130 may then send, via communication bus 117, the modified different command to controller hub 110 using the particular command protocol. Controller hub 110 is further configured to perform the modified different command, which causes peripheral device 160a to copy the portion of data 180 from system memory 120.

In some embodiments, all of data 180 may be copied into system memory 120 before peripheral device 160a copies any of data 180 from system memory 120. In some embodiments, data 180 may be transferred to peripheral device 160a via system memory 120 due to, for example, a lack of access sideband processor 130 has to peripheral device 160a via communication bus 117. In other embodiments, transferring all of data 180 into system memory 120 and then causing peripheral device 160a to copy data 180 from system memory 120 may reduce an amount of time used to transfer the data, and/or may allow peripheral device 160a to complete other tasks before receiving data 180.

Performance of commands of the second set by controller hub 110, may not utilize bandwidth of primary CPU 103. Controller hub 110, as illustrated, is capable of storing data into system memory 120 and/or to peripheral devices 160 without interfering with normal operation of primary CPU. For example, primary CPU 103 may perform processes for an operating system (OS) and/or perform processes related to other applications. Performance of these processes may not be interrupted by performance of commands of the first and second sets of commands, except as described below in regards to FIG. 3, for example, in regards to an OS update.

It is noted that use of a command protocol as described above may enable access to various devices included in computer system 100 without interfering with normal operation of computer system 100. Certain tasks for managing computer system 100 may be performed while computer system 100 continues to perform tasks for one or more users. For example, devices on computer system 100 may be reconfigured, or have driver firmware updated. Additional software processes can be loaded into system memory for later execution by primary CPU 103, including for example, updates to an operating system (details provided below in regards to FIG. 3). Accordingly, such computer management tasks may be performed with reduced downtime for the computer system, thereby improving a performance efficiency of the computer system. In addition, the computer management tasks may be performed remotely by utilizing the network interface coupled to the sideband processor. Such remote utilization may allow a system administrator to manage computer systems in a variety of location from a central location, thereby increasing a productivity of the system administrator.

It is also noted that the embodiment of FIG. 1 is merely an example for demonstration of disclosed concepts. In other embodiments, the illustrated computer system may include a different combination of elements, including additional elements. For example, more than two peripheral devices may be included, such as network interface cards, power supply management circuits, clock sources, and the like.

The computer system of FIG. 1 depicts a particular command protocol that is capable of allowing information to be shared between a sideband processor and a variety of devices installed in a computer system. Command protocols may be implemented using a variety of techniques. In FIG. 2, details of an embodiment of a command protocol are illustrated.

Moving to FIG. 2, tables are shown depicting an example of a command of the first set before and after modification. FIG. 2 includes command 113, depicting a command of the first set without modification, and modified command 114 depicting the command after a subsidiary command of the second set has been added.

As illustrated, command 113 includes five parts: frame start 216, command of the first set 218, address of first command 222, data 224 associated with command 218 and frame end 226. Frame start 216 includes one or more bits to indicate a start of a new command. These one or more bits may have a same value for all commands. Similarly, frame end 226 includes one or more bits with particular values to indicate an end of a current command. Command 218 includes a plurality of bits that represent a particular command of the first set of commands for monitoring the operating conditions of computer system 100. Valid commands 218 may include read, write, and control commands.

In some embodiments, multiple versions of read and write commands may be used to indicate different sizes of operands, such as a byte, an integer (e.g., 16 bits), a word (e.g., 32 bits), double integer (e.g., 64 bits), and the like. Control commands may be used to cause a target device to pause or resume operation, jump to a particular location in firmware, enter a particular mode, and so forth. Address 222 may identify a particular target device on which command 218 is operable. In various embodiments, address 222 may include any one or more of a system memory address, a bus address (e.g., a PCIe device address), an address of a memory location within the target device, and the like. Data 224, includes any operand for command 218 if needed or desired. For example, if command 218 is a write command, then data 224 may include one or more bytes of data to be written. If command 218 causes the target device to change operating modes, then data 224 may indicate a particular mode the target device should enter.

As disclosed above, sideband processor 130 may send a series of commands 113 to controller hub 110 to monitor operating conditions in computer system 100. One or more of these commands 113 may be queued in sideband processor 130 to be sent to controller hub 110 once communication bus 117 is available. After sideband processor 130 receives data 180 to be transferred to, for example, peripheral device 160a, sideband processor prepares data 180 to be sent via one or more commands of the second set of commands. To send a subsidiary command of the second set, sideband processor 130 identifies a command 113 pending for issue through communication bus 117. This identified command 113 is then modified to add the subsidiary command, thereby creating modified command 114.

As shown, modified command 114 includes all the parts of command 113, as described above. To the identified command 113, five additional parts are added to create modified command 114. These five parts include size 232, command 234 of the second set of commands, address 236 corresponding to command 234, sequence number 242, and data 238 corresponding to command 234.

As shown, size 232 includes a plurality of bits that correspond to a size of the subsidiary command. In various embodiments, size 232 may refer to a total size of the subsidiary command, to just an amount of data included in the subsidiary command, or a size of any other suitable combination of the parts. Command 234 includes a plurality of bits that represent a particular command of the second set of commands for transferring data between various devices included on computer system 100. Similar to command 218, valid commands 234 may include read, write, and control commands. Address 236, in a like manner as address 222, identifies a particular device in computer system 100 (e.g., peripheral device 160a) to which command 234 is directed. It is noted that address 222 and address 236 may be determined independently of one another, and therefore command 218 and command 234 may be directed towards two different devices in computer system 100.

Second data 238 includes at least a portion of data 180 to be sent to peripheral device 160a. A write command of the second set of commands may be limited to a particular number of bytes of data. Accordingly, data 180, if larger than this particular number, may be divided into a number of data portions, with each data portion being included in a respective subsidiary command. Second data 238, therefore, may represent one of these portions. In some embodiments, sideband processor 130 may be configured to compress at least some portions of data 180 to include more of data 180 into second data 238.

Sequence number 242 includes a plurality bits that determines an order of command 234 within a series of commands of the second set that are used to transfer the complete set of data 180. For example, if data 180 is large enough that ten subsidiary commands are needed to transfer all bytes of data 180 to peripheral device 160a, then sequence number 242 may be a value in the range of 1-10, 0-9, or the like. In some embodiments, an additional value may be included to identify a particular group of subsidiary commands. For example, if a different data set is received prior to data 180, to be sent, e.g., to system memory 120, then a first group of subsidiary commands may have sequence numbers such as 100, 101, 102, on so forth. A second group of subsidiary commands to transfer data 180 to peripheral device 160a may then have sequence numbers such as 200, 201, 202, etc.

In other embodiments, sequence number 242 may include an indication of a priority of the respective command 234. For example, data 180 may include both program instructions and data values for peripheral device 160a. The program instructions may be given a higher priority which may then be indicated by the respective sequence numbers 242. In some embodiments, the priority may be indicated based on the place in the sequence, with lower values having higher priorities for example. In other embodiments, to raise a priority of modified commands about to be sent over a priority of commands that have already been sent, sequence number 242 may include a particular value, such as adding a particular digit to the beginning or end (such as adding a '9' to the beginning, e.g., 9200, 9201, 9203, . . . ).

In some embodiments, sequence number 242 may be implemented as a time stamp. For example, a particular sequence number 242 may indicate a number of clock cycles from a particular point in time the respective modified command 114 was generated. A point in time may be based on receiving a respective data set associated with a series of modified commands 114, a point in time when computer system 100 and/or sideband processor 130 was last booted or reset, an indication of a time of day, and the like.

As an example of how sequence number 242 may be used, sideband processor 130 sends, to controller hub 110, a series of modified commands 114 with respective sequence numbers 242 for each included subsidiary command. Controller hub 110 sends responses back to sideband processor 130 after a respective one of the subsidiary commands included in each modified command 114 is completed. A given response from controller hub 110 may include the corresponding sequence number 242, thereby indicating which of the sent modified commands 114 corresponds to the given response.

As disclosed above, second data 238 may be compressed to include more data into one modified command 114. In some embodiments, sideband processor 130 may alternatively, or additionally, be configured to compress at least a portion of the subsidiary command. For example, the five elements of a subsidiary command may, after being generated, be compressed to reduce an overall size of modified command 114. In other embodiments, portions of a subsidiary command may be combined with similar portions of the original pending command. For example, command 234 may be combined with command 218. A number of bits used to encode command 218 in combination with command 234 may be fewer than maintaining the two commands separately.

It is noted that FIG. 2 is merely one example. Although command 113 and modified command 114 are shown with particular parts, in other embodiments, these parts may be arranged in a different order and different combinations of parts may be included (e.g. in some embodiments one or more additional parts may be added, or one or more shown parts may be omitted). In some embodiments, one or more portions of modified command may be compressed and/or combined with portions of the original command 113 to reduce a number of bits included in modified command 114.

The motherboard of FIG. 1 and the protocol of FIG. 2 illustrate how a sideband technique for sharing information with devices in a computer system may be implemented. This sideband technique may be used to perform a variety of functions. Details of one such function are illustrated in FIG. 3.

Updating an Operating System

Figure 3:
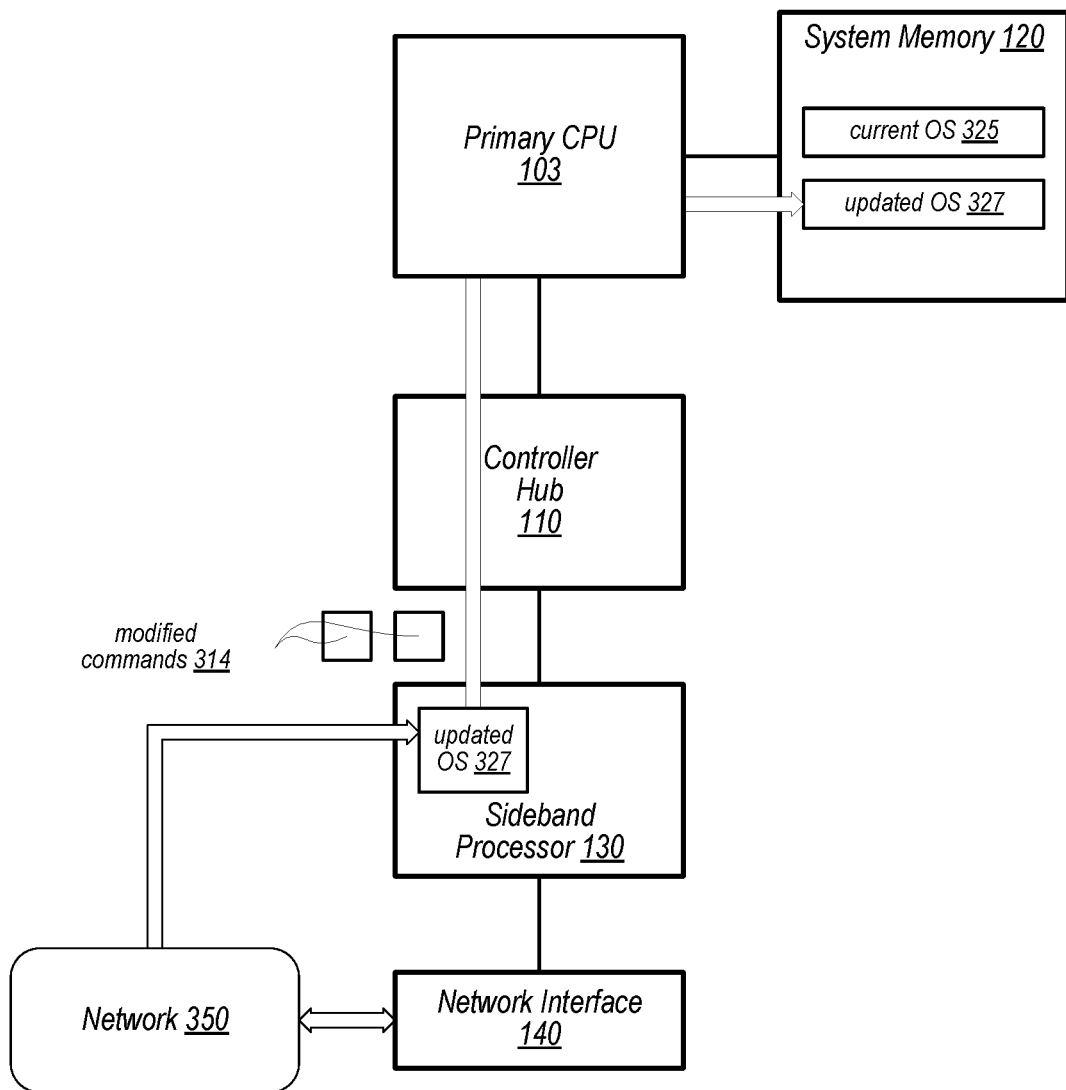
FIG. 3 depicts a block diagram of an embodiment of a computer system that includes a sideband processor capable of updating an operating system.

Turning to FIG. 3, a block diagram of another embodiment of computer system 100 is shown. Computer system 100 of FIG. 3 includes elements previously described in regards to FIG. 1, including primary CPU 103, controller hub 110, system memory 120, sideband processor 130, and network interface controller 140. Current OS 325 is shown stored within system memory 120 for use by primary CPU 103. Network interface controller 140 is communicatively coupled to network 350. Updated OS 327 is received from network 350 for installation in system memory 120. As used herein, "installation" of an OS into a system memory includes copying one or more instructions and related data for the OS into the system memory such that a processor coupled to the system memory may execute the copied instructions to implement features of the OS.

As previously described, primary CPU 103 is configured to execute current OS 325 from system memory 120 that is coupled to primary CPU 103. Primary CPU 103 has access to system memory 120 and is capable of reading instructions included in current OS 325, as well as other programs that may be stored in system memory 120.

Controller hub 110 is configured to provide an interface between primary CPU 103 and one or more peripheral devices included in computer system 100. One such peripheral device is sideband processor 130. Controller hub 110, as shown, manages communication between these peripheral devices, allowing primary CPU 103 to utilize more bandwidth for the execution of current OS 325 rather than using some of this bandwidth for interacting with the peripheral devices.

Sideband processor 130 is configured to monitor various conditions and status of primary CPU 103 and the peripheral devices in computer system 100. Sideband processor 130, as shown, is configured to communicate via network interface controller 140, for example, to a workstation of a system administrator in network 350. Using sideband processor 130, the system administrator may be able to monitor operation of computer system 100 and identify whether any issues exist that prevent proper operation.

While primary CPU 103 executes current OS 325, sideband processor 130 is configured to receive instructions for updated OS 327. Updated OS 327 may include a patch for current OS 325, to correct bugs for example, or may be a completely new revision with enhanced and/or new features. Updated OS 327 may be received as one or more files for installation in system memory 120. To install updated OS 327, sideband processor 130 sends, to controller hub 110, a series of modified commands 314 to install the received instructions into one or more regions of system memory 120. System memory 120 includes one or more types of memory and each type includes one or more banks that may be written to concurrently. Sideband processor 130, therefore, is further configured to generate a particular one of modified commands 314 to include a respective portion of the received instructions of updated OS 327. Some or all of modified commands 314 include a corresponding portion of updated OS 327. Each of the portions may be stored in different banks of system memory 120, allowing, in some embodiments, for concurrent writes to system memory 120, thereby reducing an amount of time to complete the installation.

Controller hub 110 is configured, based on the particular command of modified commands 314, to store the respective portion into the one or more of the regions of system memory 120. Controller hub 110 may complete modified commands 314 in a different order than the received order. Since primary CPU 103 is actively executing current OS 325 from system memory 120 while updated OS 327 is being installed, some portions of system memory 120 may take longer to access than others while access to the memory is being shared. Modified commands 314, even if processed by controller hub 110 in the order they were received, may complete in a different order due to delays for accessing different portions system memory 120. Controller hub 110 may reorder modified commands 314 to prioritize storage of the portions of updated OS 327 to memory locations that are currently available for access. For example, system memory 120 may include four banks of memory that may be accessed concurrently. If two of the four banks are currently busy fulfilling memory commands for primary CPU 103, then controller hub 110 may process ones of modified commands 314 that are addressed to locations in the other two memory banks.

Controller hub 110, as shown, sends, to sideband processor 130, a given response to a given command of modified commands 314 in response to completing the given command. The given response may indicate whether the given command completed with or without errors, or may simply provide an indication that the given command has been processed. Controller hub 110 includes a value in the given response that provides an indication of which of modified commands 314 corresponds to the given command. Sideband processor 130 is configured to identify the given command of the series of modified commands 314 corresponding to the given response. For example, sideband processor 130 may send the series of modified commands 314 with respective identification values for each command. The given response from controller hub 110 includes the corresponding identification value, thereby indicating which of modified commands 314 corresponds to the given command.

In some embodiments, the identification value may be an index value assigned to the given command based on an order in which it is sent by sideband processor 130. For example, if modified commands 314 includes 100 individual commands, each of modified commands 314 may be numbered from 1-100 (or 0-99, or any other suitable indexing convention) in the order they are sent. In other embodiments, the index value may include additional information regarding the given command, such as an indication of which portion of updated OS 327 is included in the given command. Other information may be included, for example, a priority of the command, a type of command (e.g., a memory access or a control command), a time stamp indicating when the given command was generated, and the like.

In some embodiments, sideband processor 130 configures updated OS 327 to correspond to a current state of computer system 100 (e.g., setting the updated OS to allow continued execution of one or more programs already being executed by the previous OS version). While primary CPU 103 executes current OS 325, various peripheral devices included in computer system 100 may be placed into various states of operation. Some peripheral devices may be enabled and fully operation, some peripheral devices may be placed into reduced power states, and other peripheral devices may be powered off. To prepare updated OS 327 for execution by primary CPU 103, sideband processor 130 may determine one or more states of these peripheral devices and store or modify values and or instructions associated with updated OS 327 to reflect the current states. For example, a graphics controller may be installed on computer system 100 and in use by primary CPU 103 in response to instructions included in current OS 325. Sideband processor 130 modifies values associated with updated OS 327 to indicate a current state of the graphics processor, such as a particular display mode, locations of a next image frame to be displayed, and the like.

After controller hub 110 has processed all of modified commands 314 and sent appropriate responses to sideband processor 130, sideband processor 130 sends an indication to primary CPU 103 indicating that updated OS 327 is installed. In some embodiments, this indication causes primary CPU 103 to switch, without rebooting, from executing current OS 325 to executing updated OS 327. By configuring updated OS 327 to correspond to the current state of computer system 100, primary CPU 103 may be capable of switching execution from current OS 325 to updated OS 327 without performing a reboot of computer system 100. For example, a Linux kexec command may be used to cause primary CPU 103 to switch without rebooting. Such a command may initiate a new kernel, using updated OS 327. The kexec command may further enable processes being executed in association with current OS 325 to be resumed, without a reboot, in association with updated OS 327.

Use of the disclosed sideband technique for accessing memory locations of devices in a computer system may enable an updated version of an OS to be installed on the computer system without performing a complete reboot. As used herein, a "complete reboot" refers to exiting all open processes and restarting the OS in an initialized state, e.g., the OS behaves as if no processes have been initiated beyond a typical boot sequence. For example, after a complete reboot, the OS may assume that all other circuits in the computer system are in a reset state and no processes have been launched from within the OS. A complete reboot of a computer system may cause the computer system to be down (e.g., not operable for providing online services) for several minutes. In an enterprise system that supports a large number of users, any comparable system that performs a large number of operations per second, minutes of downtime may result in an undesirable impact to efficiency. If ten thousand enterprise computer systems require an OS upgrade, for example, there could be so much downtime that additional computer systems have to be added (temporarily or permanently) to an enterprise to accommodate computing demand during the upgrade (and thus may also cost money due to lost revenue during the down-time).

By using the described sideband technique, updated versions of OSes may be installed efficiently and remotely by a system administrator, and avoiding a complete reboot with the associated down-time. In some embodiments, some limited down-time may still occur as the processor switches from the current version to the updated version of the OS. For example, a partial reboot may be performed to initialize some operational states that cannot be modified by the sideband processor. For example, some active processes may be exited while other processes are kept active by, for example, copying file descriptors from the current version of the OS to the updated version of the OS. Such a partial reboot, however, may result in in a much shorted down-time than the complete reboot, for example, fractions of a second, or a few seconds rather than delays of minutes or longer. Additional details regarding switching from a current version of the OS to an updated version of the OS will be discussed later in the disclosure.

It is noted that the example of FIG. 3 is used to describe the disclosed techniques. Variations of the illustrated computer system are contemplated. For example, although two modified commands 314 are illustrated, in other embodiments, any suitable number of commands may be sent by the sideband processor to cause controller hub 110 to install the updated OS. As previously disclosed, controller hub 110 may, in some embodiments, be included within a same IC as primary CPU 103.

Figure 4:
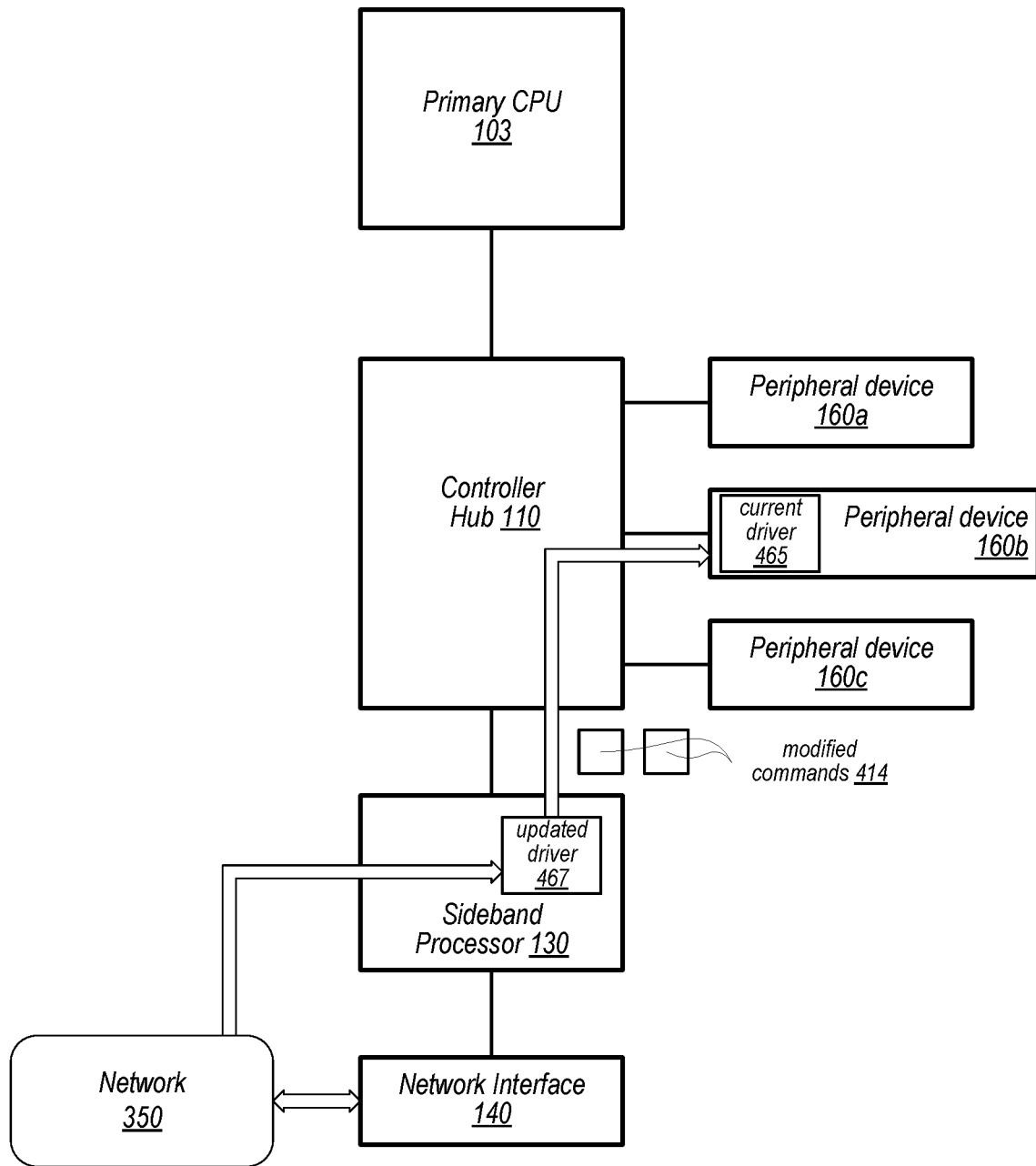
FIG. 4 illustrates a block diagram of an embodiment of a computer that includes a sideband processor capable of updating a driver for one or more peripherals.

FIG. 3 describes use of the disclosed sideband technique to update an OS. The sideband technique may be used to perform other functions as well. FIG. 4 illustrates another such function involving drivers for peripherals.

Updating Driver Firmware

Proceeding to FIG. 4, a block diagram of another embodiment of computer system 100 is shown. In a similar manner as depicted in FIG. 3, computer system 100 of FIG. 4 includes elements previously described in regards to FIGS. 1 and 3, including primary CPU 103, controller hub 110, sideband processor 130, network interface controller 140, and network 350. Computer system 100 further includes peripheral devices 160a-160c (collectively peripheral devices 160). Updated driver 467 is received from network 350 for installation in peripheral device 160b.

As shown, primary CPU 103 is configured to execute one or more processes. These processes may be associated with an operating system and/or associated with other programs performed by primary CPU 103. One or more of peripheral devices 160 may be utilized while executing the one or more processes.

Peripheral devices 160, as illustrated, are configured to utilize respective drivers to perform one or more operations. In various embodiments, peripheral devices 160 may correspond to any suitable type of device, such as a graphics coprocessor, audio coprocessor, network interface, wireless interface, and the like, and may be installed during manufacturing of computer system 100, or installed after manufacturing, for example, by using a socket that is included in a motherboard of computer system 100. The respective drivers enable each of peripheral devices 160 to perform the operations associated with each device. For example, a driver for a graphics coprocessor may enable the graphics coprocessor to receive image frames, process the image frame for a particular display, and send the frame to be shown on the particular display. Such drivers may have updates made available from time-to-time that correct bugs, enhance available features, enable new features, and/or provide other desirable changes from a current driver.

Controller hub 110 and sideband processor 130 perform tasks as previously described. In addition, sideband processor is configured, while primary CPU 103 executes the one or more processes, to receive updated driver 467 to replace the current driver 465. As illustrated, updated driver 467 is to replace current driver 465 that is currently installed in peripheral device 160b. Peripheral device 160b, as shown, includes a memory, such as a non-volatile flash memory, for storing drivers. In other embodiments, as will be disclosed below, computer system 100 may include a non-volatile memory for storing drivers for any one or more of peripheral devices 160.

Sideband processor 130 receives instructions included in updated driver 467 from network 350 via network interface controller 140 that is coupled to sideband processor 130. For example, a system administrator, using a computer system coupled to network 350, may schedule updated driver 467 to be sent to computer system 100 for installation at a particular date and time, or when sideband processor 130 is not busy with other tasks.

Before installing updated driver 467 in peripheral device 160b, sideband processor 130 notifies primary CPU 103 that updated driver 467 is available for installation. In some embodiments, sending the notification includes sending the notification via one or more commands to controller hub 110. These one or more commands cause controller hub 110 to send the notification to primary CPU 103. Sideband processor 130 receives, from primary CPU 103 (e.g., via controller hub 110), an acknowledgement that use of peripheral device 160b has been paused. With use of peripheral device 160b paused, sideband processor may be allowed to begin installation of updated driver 467.

To install updated driver 467 in an example, sideband processor 130 sends modified commands 414. As shown, sideband processor 130 sends modified commands 414 to controller hub 110, which in turn cause controller hub 110 to install updated driver 467 into the non-volatile memory included in peripheral device 160. As described above in regards to FIG. 3, sideband processor 130 may generate modified commands 414 to include a respective portion of the received instructions of updated driver 467. Some or all of modified commands 414 may include a corresponding portion of updated driver 467. In addition, sideband processor 130 includes an identification value in at least some of modified commands 414. Controller hub 110 may, in response to completing a given one of modified commands 414, send a response to sideband processor 130 indicating the given command has been performed, the response including the identification value.

After modified commands 414 have been performed, sideband processor 130 notifies peripheral device 160b that updated driver 467 is installed. Peripheral device 160b is configured, in response to the indication, to utilize updated driver 467 to perform the one or more operations associated with the device. In some embodiments, to facilitate communication with peripheral device 160b, sideband processor 130 compiles a communication process for peripheral device 160b, and then sends the compiled communication process to peripheral device 160b. Using the compiled communication process, sideband processor 130 sends one or more commands to peripheral device 160b, e.g., via controller hub 110. These one or more commands cause peripheral device 160b to use updated driver 467.

Peripheral device 160b may be unavailable during the installing of the updated version of the driver. Other ones of peripheral devices 160, however, may remain available for use by primary CPU 103. After the installation of updated driver 467 is complete, peripheral device 160b may be available without performing a system reboot. In other embodiments, a soft reboot may be performed to place peripheral device into a known state.

Similar to previously descriptions, use of the disclosed sideband technique for accessing memory locations of devices of a computer system may enable an updated version of a driver to be installed for a peripheral device included in a computer system, without a need to perform a complete reboot of the computer system. As stated, a complete reboot of a computer system may cause the computer system to be down for an undesirable amount of time. By using the described sideband technique, updated versions of drivers may be installed efficiently and remotely by a system administrator, and avoiding a complete reboot with the associated down-time.

It is noted that FIG. 4 is merely one example of a computer system. In other examples, a different number of peripherals may be included. In some embodiments, additional processors may be included. Although one network interface is shown, additional network interfaces may be included and used to connect to networks different than the illustrated network 350.

FIGS. 3 and 4 and the accompanying descriptions illustrate embodiments in which either an OS or a driver is updated in a computer system using the disclosed sideband techniques. An embodiment of a motherboard of such a computer system is shown in FIG. 5 in which both an OS and a driver may be updated concurrently.

Combined Capabilities

Figure 5:
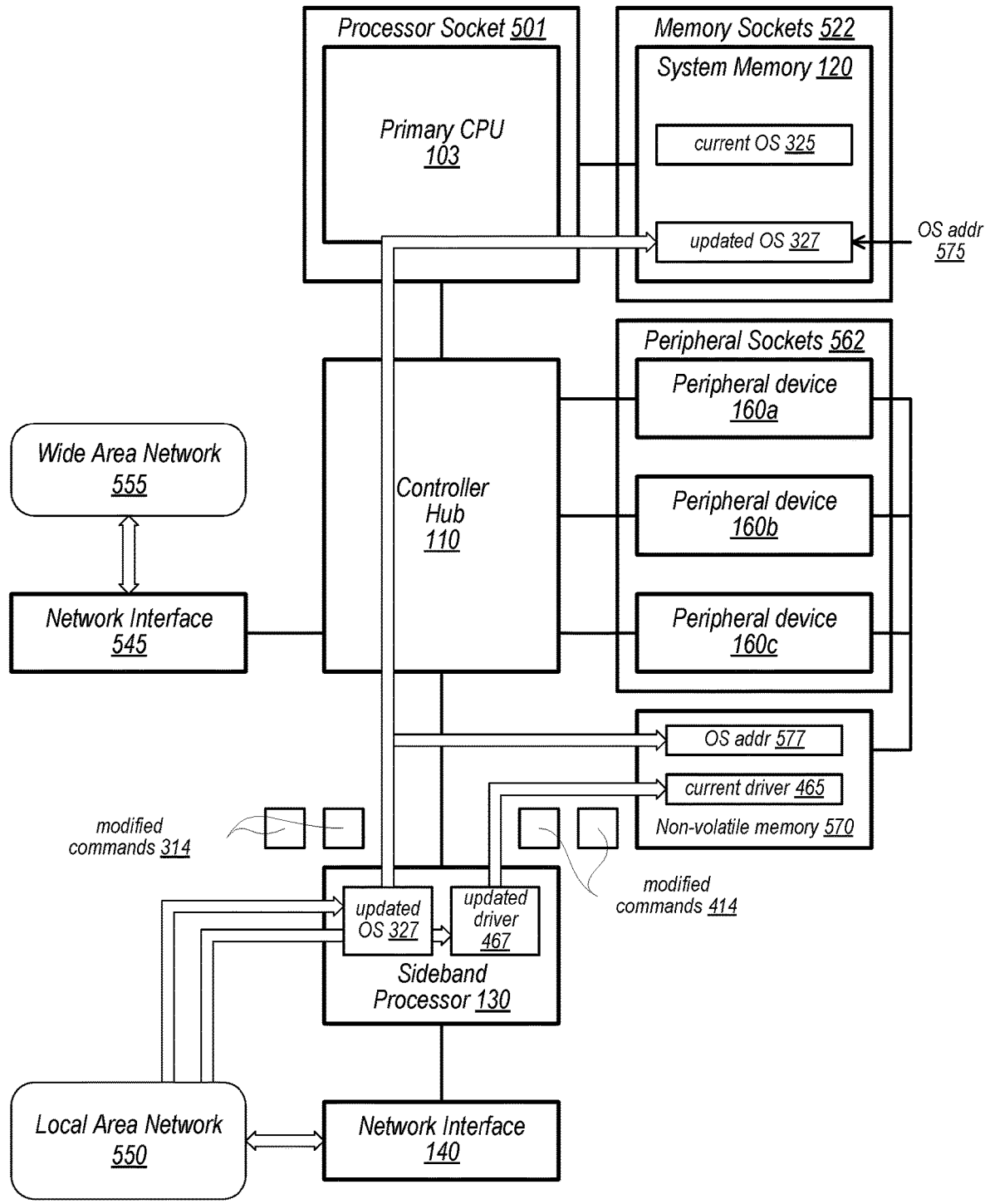
FIG. 5 shows a block diagram of an embodiment of a motherboard of a computer system that includes a sideband processor capable of updating an operating system and a driver for one or more peripherals.

Moving now to FIG. 5, an embodiment of a motherboard included in a computer system that supports the disclosed sideband techniques is illustrated. Motherboard 500 includes elements shown in FIGS. 1, 3, and 4, such as primary CPU 103, controller hub 110, system memory 120, sideband processor 130, network interface controller 140, network 350, and peripheral devices 160. Motherboard 500 further includes processor socket 501, memory sockets 522, peripheral sockets 562, network interface controller 545, and non-volatile memory 570. Network interface controller 140 is coupled to local area network 550, while network interface 545 is coupled to wide area network 555.

Motherboard 500 may be used to implement computer system 100 of FIGS. 1, 3, and 4. Various embodiments of computer systems utilize motherboards such as motherboard 500 to provide a mechanism to couple a particular processor, such as primary CPU 103, to other circuits that are included in the computer system. As illustrated, motherboard 500 includes processor socket 501 that is configured to receive primary CPU 103 that is, in turn, configured to execute current OS 325 from system memory 120. Motherboard 500 further includes memory sockets 522 with one or more sockets that are configured to receive respective memory modules that are included in system memory 120. Memory sockets 522 may include one or more dual in-line memory module (DIMM) sockets configured to receive memory module circuit boards that conform to the DIMM standard. Peripheral sockets 562 are included on motherboard 500 to receive one or more peripheral devices that may enable additional features to computer system 100 and/or may offload processing functions from primary CPU 103, thereby increasing an amount of bandwidth for primary CPU 103 to perform additional and/or more complex tasks. Peripheral sockets 562 may include, for example, one or more Peripheral Component Interconnect Express (PCIe) sockets.

Non-volatile memory 570 is included on motherboard 500 as shown and may be used to store boot code for when motherboard 500 is rebooted. Non-volatile memory 570, as shown, is also used to store driver software, including current driver 465 and updated driver 467. In some embodiments, non-volatile memory 570 may include two or more memory devices, such as embedded MultiMediaCards (eMMCs). In such embodiments, one eMMC may be used for storing boot code (e.g., a Basic Input/Output System, or "BIOS," code) and one eMMC for storing driver code for one or more peripherals.

Controller hub 110 as shown is configured to provide an interface between processor socket 501 and peripheral socket 562. In a similar manner as previously described, controller hub 110 is also configured to receive modified commands 314 and 414 from sideband processor 130, and to, based on the received modified commands 314 and 414, install updated OS 327 and updated driver 467. As illustrated, controller hub 110 installs updated OS 327 into system memory 120 at OS address 575. OS address 575 may be determined by various techniques, such as, being assigned by a system administrator responsible for the updated OS 327, by primary CPU 103 based on an address of current OS 325, by sideband processor 130 based on an analysis of a current state of system memory 120, and the like. Updated OS 327 is installed using sideband techniques such as described above in regards to FIG. 3. To cause primary CPU 103 to execute updated OS 327, sideband processor 130 may send commands to controller hub 110 to cause controller hub 110 to modify BIOS code stored in non-volatile memory 570 to include OS address 577 for updated OS 327.

In addition to updated OS 327, controller hub 110 may install updated driver 467. As described above in regards to FIG. 4, updated driver 467 was installed into peripheral device 160b. In the embodiment of FIG. 5, updated driver 467 is installed into non-volatile memory 570. The sideband technique for installing updated driver 467 into non-volatile memory 570 may be substantially the same as described above in regards to FIG. 4.

In some embodiments, the installations of updated OS 327 and updated driver 467 may be performed serially with either installation beginning first. In other embodiments, portions of the installations may overlap, and in some cases entire installations may be performed concurrently. For example, installation of updated driver 467 may be performed in its entirety while updated OS is being installed into system memory 120, or vice versa.

Network interface controller 545, as shown, is a network interface card (NIC) used to couple primary CPU 103 (e.g., via controller hub 110) to wide area network 555. Network interface controller 545 may be implemented on motherboard 500 or may be on a separate circuit board installed on or coupled to motherboard 500, e.g., using a network card socket. In some embodiments, network interface controller 545 may include more than one circuit, such as an Ethernet card installed on motherboard 500 and then coupled to a wired and/or wireless router that provides access to the internet.

In a similar manner, network interface controller 140 may be a NIC (implemented on motherboard 500 or be installed as a separate device, e.g., utilizing a network card socket) that is used to couple sideband processor 130 to local area network 550. Local area network 550 may be a network implemented within a room, within a building, or within a campus including a plurality of buildings. For example, local area network 550 may be a part of a trusted security zone used by one or more system administrators to manage operation and maintenance of an enterprise computer system that includes computer system 100 that, in turn, includes motherboard 500. Such a trusted security zone may restrict access to sideband processor 130 to help prevent unauthorized access to sideband processor 130. In some embodiments, local area network 550 may also provide access to wide area network 555. In other embodiments, network interface controller 140 may be capable of bypassing local area network 550 and access wide area network 555 directly.

As illustrated, sideband processor 130 receives instructions for updated OS 327 and separate instructions for updated driver 467 via network interface controller 140 that is coupled to sideband processor 130 and is separate from network interface controller 545 used by primary CPU 103. Using a separate network interface such as network interface controller 140 to provide updated OS software and updated driver code may provide a system administrator with a more secure method for delivering code updates by avoiding use of a wide area network that could be accessible to unauthorized users. In addition, using the separate network interface controller 140 may also avoid adding traffic onto network interface controller 545 that is used by primary CPU 103. In some embodiments, motherboard 500 may be included in a server computer that provides online services to a plurality of users. In such embodiments, network interface controller 545 may be heavily used which could result in performance bottlenecks if OS and/or driver updates were also provided on network interface controller 545.

It is noted that the embodiment of FIG. 5 is merely an example. For clarity, only elements for demonstrating the disclosed concepts have been shown. In other embodiments, additional or a different combination of elements may be included, such as a different number of peripheral devices and/or additional processors.

Figure 6:
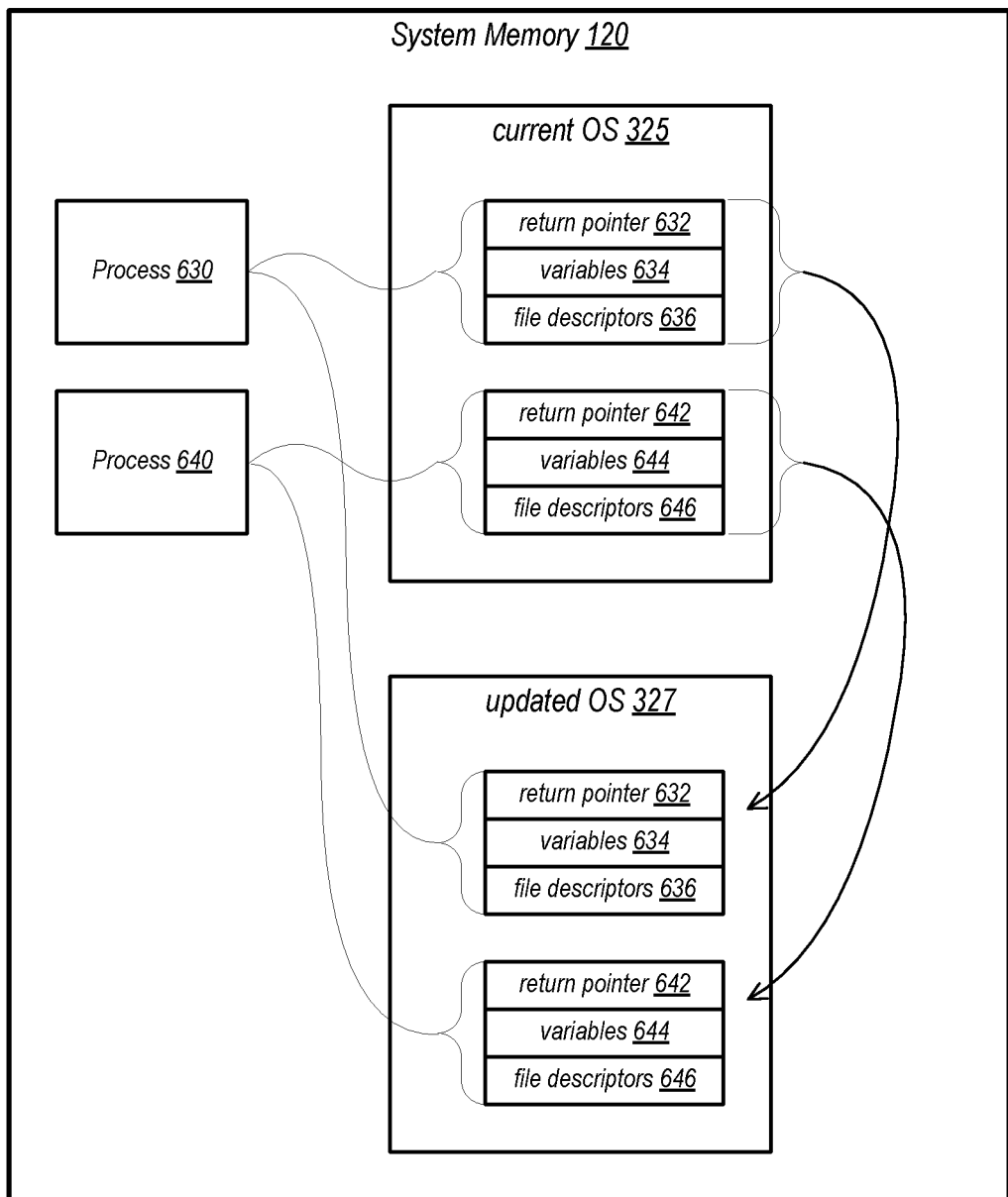
FIG. 6 includes a block diagram depicting an installation of an updated operating system that includes active processes.

FIG. 3 illustrated an embodiment of a computer system capable of updated an operating system using the disclosed sideband communication techniques. In FIG. 6, additional details are disclosed regarding how such a computer system may switch from a current OS to an updated OS.

Examples of System Memory Usage

Turning now to FIG. 6, a block diagram of a system memory is illustrated that depicts embodiments of a currently installed OS and an updated OS. As shown, system memory 120 corresponds to system memory 120 included in computer system 100 of FIGS. 1, 3, and 4, and in motherboard 500 in FIG. 5. Current OS 325 and updated OS 327 have been installed in system memory 120. In addition, primary CPU 103, while executing current OS 325, may also be executing processes 630 and 640 that are currently stored in system memory 120. Referring to FIGS. 3 and 6, a process for switching from execution of current OS 325 to updated OS 327 is disclosed.

Using the disclosed sideband techniques for accessing memory locations of devices in computer system 100, sideband processor 130 installs updated OS 327 into one or more regions of system memory 120, while primary CPU 103 continues to execute current OS 325. Primary CPU 103 may further execute instructions associated with processes 630 and 640 while the installation of updated OS 327 is performed. In order to switch primary CPU 103 from executing current OS 325 to executing updated OS 327, updated OS 327 is further modified to support execution of processes 630 and 640.

To support execution of processes 630 and 640, sideband processor 130 may send commands that cause the copying of information associated with processes 630 and 640, including file descriptors 636 and 646, into the one or more regions of system memory 120 where updated OS 327 is installed. As shown, processes 630 and 640 each have several pieces of information included in current OS 325 that is related to the execution of the two processes. Return pointers 632 and 642, variables 634 and 644, and file descriptors 636 and 646 are examples of such pieces of information. Return pointers 632 and 642 may correspond to a return address that primary CPU 103 is to access after the respective process 630 or 640 completes. Variables 634 and 644 may include one or more global variables used, respectively, by processes 630 and 640 as well as by other processes executed by primary CPU 103. File descriptors 636 and 646 include one or more indications of files or other system addresses from which process 630 or 640 receives information and/or to which process 630 or 640 sends information. File descriptors 636 and 646 may include names of files that are read and/or written by processes 630 or 640. File descriptors 636 and 646 may also include indications of printers and/or displays to which information is sent, as well as indications of input devices from which information is received.

Before primary CPU 103 switches to executing updated OS 327, any one or more of return pointers 632 and 642, variables 634 and 644, file descriptors 636 and 646, as well as other information associated with processes 630 and 640, may be copied to locations in system memory 120 associated with updated OS 327. Sideband processor 130, using commands sent to controller hub 110, may identify valid processes, e.g., processes that remain operable in the foreground or background of current OS 325, further identify the information associated with the valid processes, and then copy the associated data to a memory region associated with updated OS 327. After updated OS 327 has been modified, sideband processor 130 may then send an indication to primary CPU 103, causing primary CPU 103 to, execute updated OS 327. In some embodiments, sideband processor 130 may utilize a kexec command (e.g. in a Linux™ context, or an exec command, in a UNIX context) to cause primary CPU 103 to switch to updated OS 327. Updated OS 327 may then use file descriptors 636 and 646, and processes 630 and 640, that were previously in use by the current OS 325.

It is noted that the system memory of FIG. 6 is an example for demonstrating the disclosed concepts. In other embodiments, a different number of processes may be included. In some embodiments, different sets of information associated with the processes may be included and copied to the updated OS.

Figure 7:
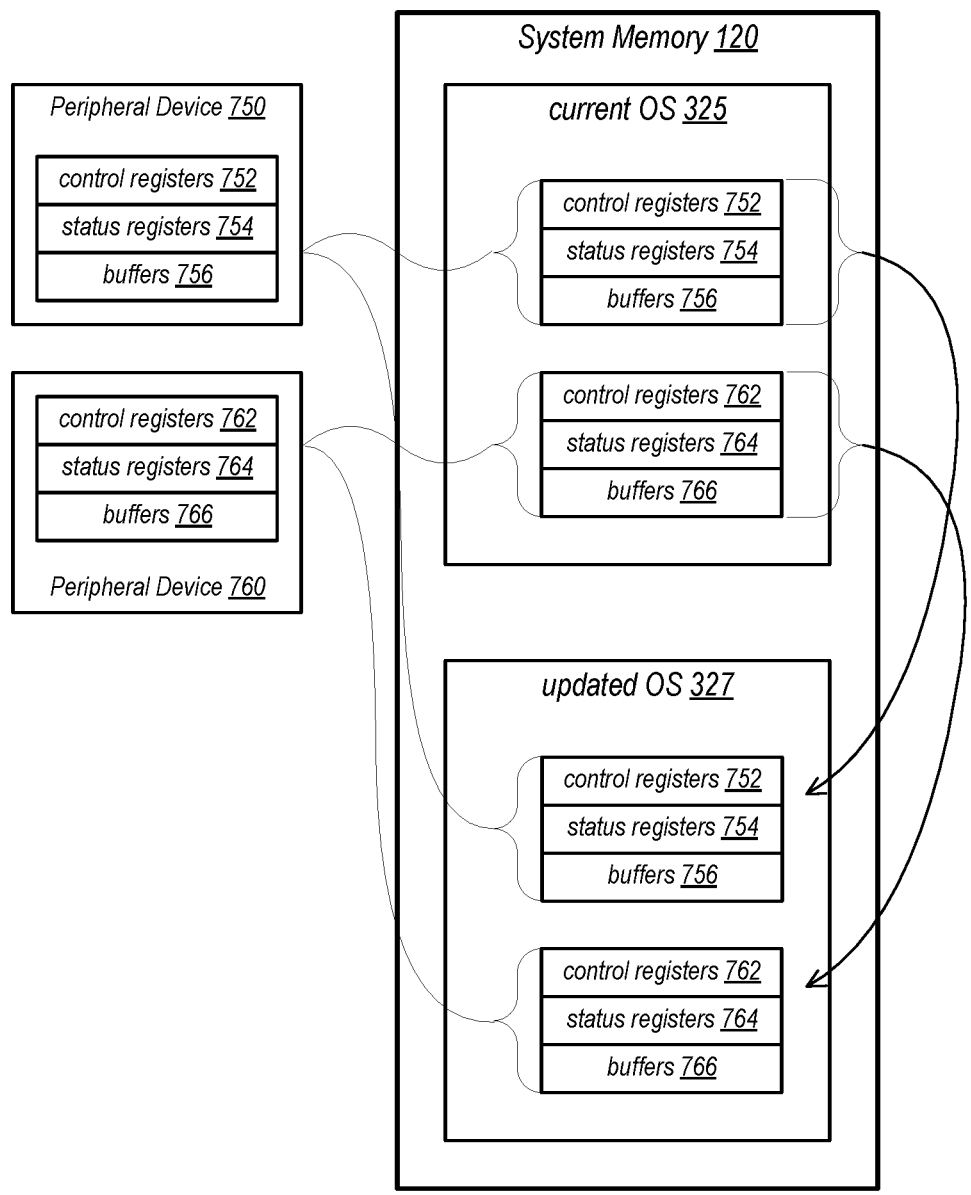
FIG. 7 includes a block diagram depicting another installation of an updated operating system that includes active peripherals

FIG. 6 describes information associated with processes being copied from a current version of an OS to an updated version of the OS. In some embodiments, to switch to an updated version of an OS, the update version of the OS may be modified with information associated with operation of peripheral devices installed in a computer system. FIG. 7 illustrates such an embodiment.

Proceeding now to FIG. 7, a block diagram of a system memory that depicts embodiments of a currently installed OS and an updated OS is shown. In a similar manner as illustrated in FIG. 6, system memory 120 corresponds to system memory 120 included in computer system 100 of FIGS. 1, 3, and 4, and in motherboard 500 in FIG. 5. Current OS 325 and updated OS 327 have been installed in system memory 120. In addition, peripheral devices 750 and 760 are included in computer system 100. Various memory locations associated with current OS 325 include values associated with the use of peripheral devices 750 and 760. Referring to FIGS. 3 and 7, a process for switching from execution of current OS 325 to updated OS 327 while maintaining operation of peripheral devices 750 and 760 is disclosed.

While primary CPU 103 executes current OS 325, sideband processor 130, using the disclosed sideband techniques, installs updated OS 327 into one or more regions of system memory 120. As shown, switching primary CPU 103 from executing current OS 325 to executing updated OS 327, includes transferring, to updated OS 327, the values associated with peripheral devices 750 and 760. Peripheral devices 750 and 760 may, independently, include one or more registers and/or buffers. These registers and buffers may be implemented in circuits included in, respectively, peripheral devices 750 and 760, and/or may be included in driver software used to operate the peripheral devices. In some embodiments, current OS 325 maintains a local copy of last known values for these registers and buffers. These registers and buffers include control registers 752 and 762, status registers 754 and 764, and buffers 756 and 766. Control registers 752 and 762 may be used by current OS 325 to operate peripheral devices 750 and 760. For example, peripheral device 750, in some embodiments, may be a network interface card (NIC) used to communicate to other computer systems. Control registers 752 may, therefore, allow primary CPU 103 to configure the NIC for a particular data rate (e.g., 480 Mbps, or 1.0 Gbps, and the like), a particular communication protocol (e.g., 802.11a, or 802.11n, etc.), to select a particular power mode (e.g., always on, sleep when idle, etc.), as well as other such settings. Status registers 754, in a similar manner, may indicate particular conditions of the NIC, such as idle communication channels, completion of a data packet transmission, reception of a data packet, and the like. Buffers 756 may include transmit and receive buffers for, respectively, storing data packets before being sent and while being received.

In such embodiments, switching from current OS 325 to updated OS 327 includes halting primary CPU 103 in a safe state, determining a current state of peripheral devices 750 and 760, and then modifying the instructions for updated OS 327 to correspond to the current state of peripheral devices 750 and 760. For example, sideband processor 130 may send a command that causes primary CPU 103 to pause operation. Pausing operation allows sideband processor 130, in some embodiments, to determine a current state of peripheral devices 750 and 760. Sideband processor 130 may, by sending commands to controller hub 110, read the registers and buffers directly from the peripheral devices and/or from system memory 120 associated with current OS 325. After reading the values in the registers and buffers, sideband processor 130 may copy the values into regions of system memory 120 that are associated with updated OS 327 and/or may modify some instructions of updated OS 327 to correspond to the current state the peripheral devices 750 and 760.

It is noted that the embodiment of FIG. 7 is one example. A different number of peripheral devices may be included in other embodiments. In some embodiments, different sets of registers and buffers for each peripheral device may be included.

Figure 8:
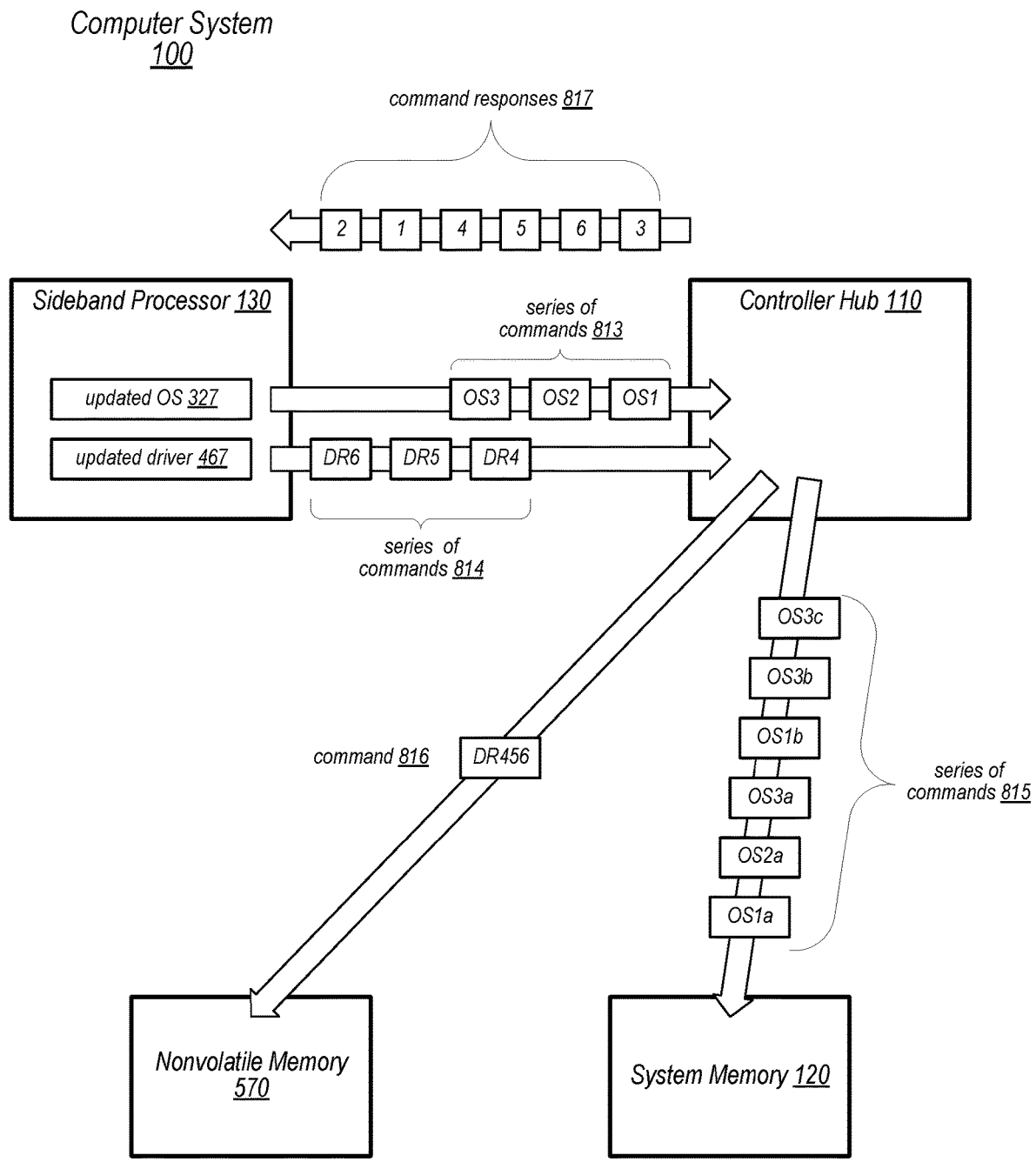
FIG. 8 illustrates a block diagram of an embodiment of a computer system showing a flow of commands to update an operating system and a driver.

FIGS. 1-5 describe systems and techniques for implementing sideband communications to a computer system. FIG. 8 illustrates an example of how a flow of commands may occur when updating a version of an OS and a version of a driver.

Command and Response Flow

Moving to FIG. 8, an embodiment of a computer system that supports sideband commands is illustrated. Computer system 100 includes a depiction of a flow of commands for updating a peripheral device driver and a version of an OS. Computer system 100 includes previously described elements, including sideband processor 130, controller hub 110, system memory 120 and non-volatile memory 570. Sideband processor 130 sends series of commands 813 and series of commands 814 to controller hub 110. Series of commands 813 include three commands for installing updated OS 327 (OS1, OS2, and OS3) while series of commands 814 includes three commands for installing updated driver 467 for a peripheral device (DR4, DR5, and DR6).

Sideband processor 130 receives, updated OS 327 and updated driver 467 from, for example, a system administrator via network interface controller 140 according to an embodiment. Sideband processor 130 prepares series of commands 813 and 814 by generating a particular command of each series of commands to include a respective portion of the respective received instructions. For example, command OS2 may cause controller hub 110 to store a respective portion of updated OS 327 into one or more regions of system memory 120. Similarly, command DR5 may cause controller hub 110 to store a respective portion of updated driver 467 into a portion of non-volatile memory 570 that is associated with a particular peripheral device related to updated driver 467.

Generating each series of commands may include, placing a respective identification value for each command of each series. As shown, each of series of commands 813 are indexed with a different number, 1, 2, and 3. Similarly, each of series of commands 814 are indexed with a different number, 4, 5, and 6. Although integer values are used in the present example, any suitable method for generating an identifying value may be utilized. For example, alphabetic characters may be used as well as a compound identifier. In some embodiments, a first value may represent a particular series of commands and a second value represent a particular command in the series, e.g., A1, A2, and A3 for commands OS1, OS2, and OS3, and B1, B2, B3 for commands DR4, DR5, and DR6. Sideband processor 130 sends the generated commands to controller hub 110. In some embodiments, sideband processor may send all commands of series of commands 813 before sending a first command of series of commands 814. In other embodiments, sideband processor 130 may recognize that series of commands 813 may take some time to complete, and instead overlap transmission of commands such that one or more commands of series of commands 814 is sent before the final command of series of commands 813 is sent.

After receiving one or more commands of series of commands 813, controller hub 110 decodes the received commands and prepares series of commands 815 to send to system memory 120. In some embodiments, the command structure between sideband processor 130 and controller hub 110 may differ from a command structure between controller hub 110 and various memories or devices coupled to controller hub 110. As an example, series of commands 815, sent from controller hub 110 to system memory 120, includes six commands as compared to the three commands of the corresponding series of commands 813.

To process series of commands 813, controller hub 110 generates one or more commands for each command of series of commands 815. As shown, controller hub 110 generates commands OS1a and OS1b to perform command OS1 of series of commands 813. Command OS2a is generated to perform command OS2 of series 813. Commands OS3a, OS3b, and OS3c are generated to perform command OS3 of series 813. Commands of series of commands 815 may store a portion of the instructions of updated OS 327 into respective locations in system memory 120, and/or may include control commands for system memory 120 related to storing updated OS 327.

To reduce an amount of time for performing series of commands 815, controller hub 110 may process commands in a different order than they are received. As illustrated, sideband processor is configured to send series of commands 813 to controller hub 110 in a first order: OS1, OS2, and then OS3. Controller hub 110, however, may complete series of commands 815 in a different order than an order in which series of commands 813 is received. In the present example, OS1a is sent to system memory 120 first, followed by OS2a, OS3a, OS1b, OS3b and OS3c. Accordingly, series of commands 813 may be completed in the order OS2, followed by OS1, and then OS3. In addition, after receiving series of commands 814, controller hub 110 generates a single command 816 (DR456) to store updated driver 467 in non-volatile memory 570. Controller hub 110 may send DR456 to non-volatile memory 570 before completing series of commands 815. As illustrated, command DR456 completes after command OS1b and before command OS3c, such that the commands of series 813 and 814 are completed in the order OS2, OS1, DR4, DR5, DR6, and then OS3.

After a given command has completed processing, controller hub 110 sends a corresponding command response 817 to sideband processor 130 according to an embodiment. Command responses 817 may provide an indication that the corresponding command sent by sideband processor 130 has completed. In some cases, a particular one of command responses 817 may include additional information, such as whether the corresponding command completed successfully or not. In some instances, a command from sideband processor 130 may include a request for data or other information (e.g., a status of a given command or series of commands, or a request for a checksum or other value that may be used to confirm a successful completion of previously sent commands.

As shown, sideband processor 130 receives command responses 817 corresponding to ones of series of commands 813 and 814. Controller hub 110 includes in each of command responses 817, a particular identification value identifying a corresponding one of the series of commands. For example, controller hub 110 may include a same index value in a given command response 817 that sideband processor 130 used in the corresponding one of series of commands 813 and 814, such as adding "2" to the command response corresponding to command OS2.

Sideband processor 130 receives a given one of command responses 817 from controller hub 110 and determines a respective one of series of commands 813 or 814 corresponding to the given command response. To determine the respective command corresponding to the received command response, sideband processor 130 may match the included index value to the index value used for the corresponding command. Accordingly, sideband processor 130 may be configured to maintain a list of sent commands and their respective index values at least until a corresponding response has been received indicating that the sent command has been successfully performed.

It is noted that the computer system of FIG. 8 is one example of how a flow of commands from a sideband processor to a controller hub may be performed. FIG. 8 merely depicts elements used to demonstrate the disclosed concepts. Other embodiments may include a different number of destinations for commands sent by sideband processor 130. For example, in some embodiments, an updated driver may be sent to a peripheral device instead of, or in addition to, non-volatile memory 570.

Figure 11:
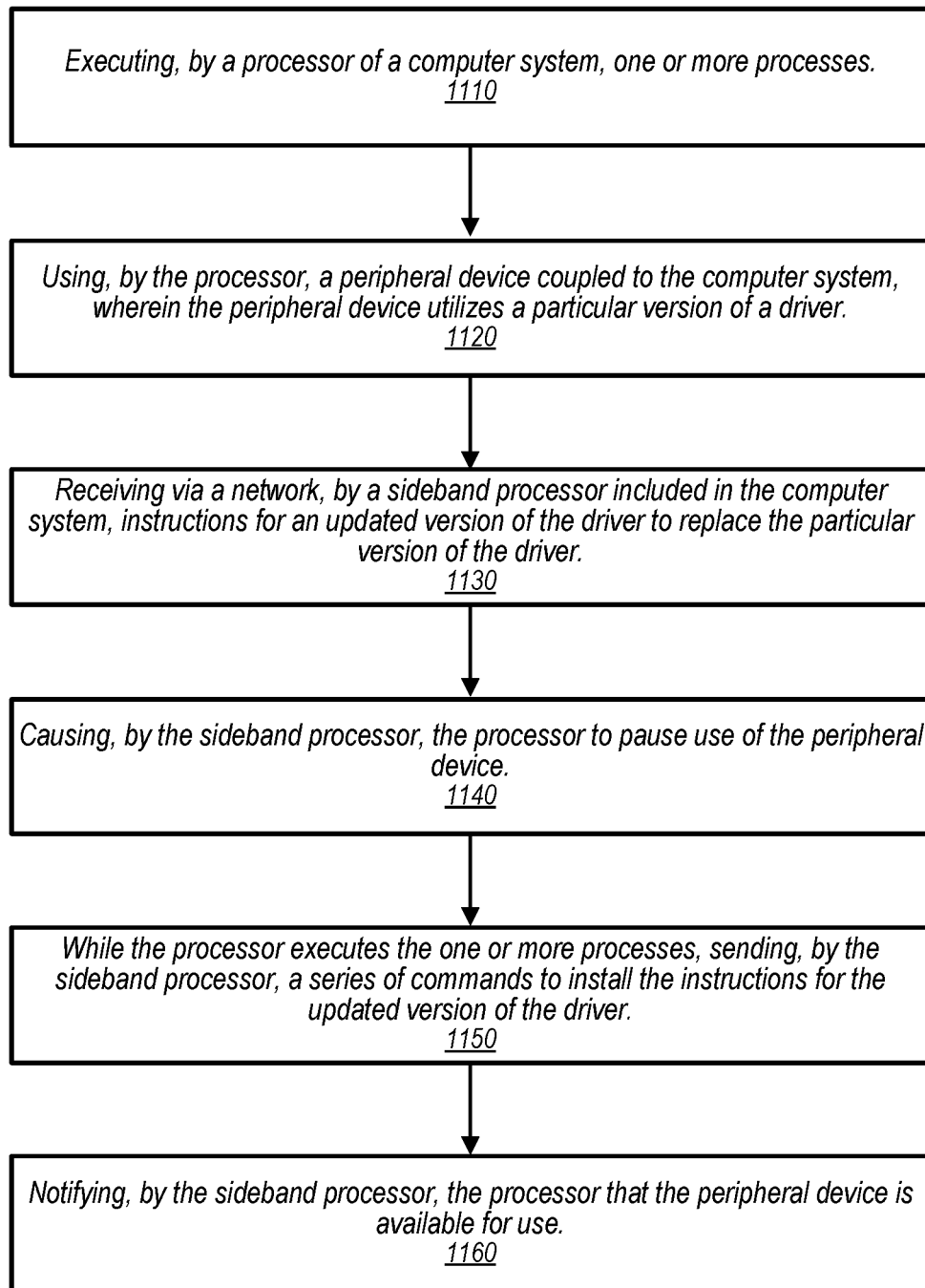
FIG. 11 shows a flow diagram of an embodiment of a method for updating a driver of a peripheral installed on a computer system that implements a sideband command protocol.

FIGS. 1-8 illustrate block diagrams of computer systems that implement a sideband communication technique for processing commands related to management of the computer system. Such systems may perform the disclosed tasks using a variety of methods. Three such methods are illustrated in FIGS. 9-11.

Exemplary Methods

Figure 9:
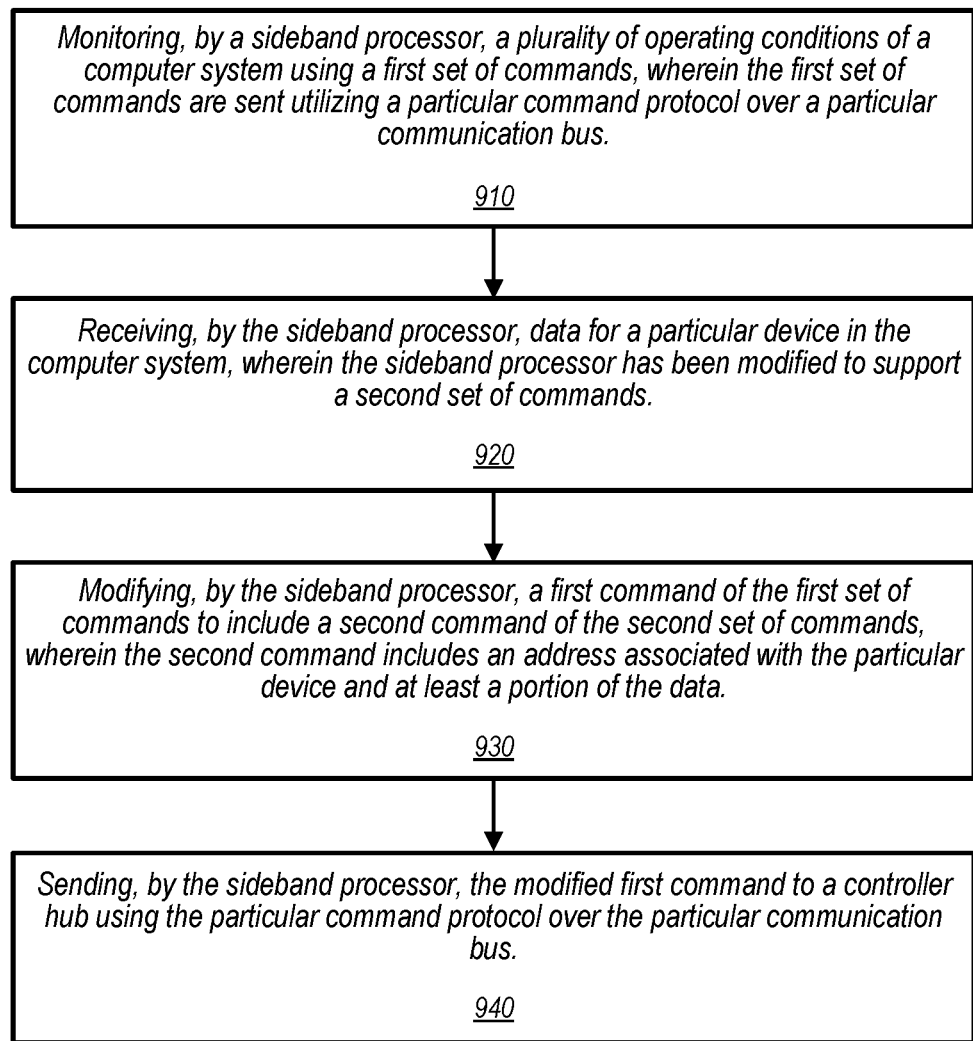
FIG. 9 depicts a flow diagram of an embodiment of a method for implementing a sideband command protocol on a computer system.

Turning to FIG. 9, a flowchart of an embodiment of a method for implementing a sideband command protocol in a computer system is illustrated. Method 900 may be performed by a computer system such as computer system 100 in FIGS. 1, 3-5, and 8. More specifically, method 900 may be performed by sideband processor 130 in computer system 100 by, for example, accessing a non-transitory, computer-readable medium having program instructions stored thereon that are executable by sideband processor 130 to cause the operations described in regards to FIG. 9. Referring collectively to FIGS. 1 and 9, method 900 begins with block 910.

Method 900 includes, at block 910, monitoring, by sideband processor 130, a plurality of operating conditions of computer system 100 using a first set of commands, wherein the first set of commands are sent utilizing a particular command protocol over communication bus 117. Utilizing the first set of commands, sideband processor 130 may be capable of monitoring, for example, any one or more of: an operating temperature of computer system 100, a voltage level of one or more power supply nodes, a current workload of primary CPU 103, an amount of data traffic in progress through peripheral devices 160, an amount of system memory 120 that is currently available, and the like. To monitor the operating conditions, sideband processor 130 utilizes a first set of commands that, when performed by controller hub 110, result in values representing the various operating conditions to being received by controller hub 110, which in turn, sends the received values to sideband processor 130. Various ones of the first set of commands are sent by sideband processor 130, serially, to controller hub 110. The responses, including values representing respective operating conditions, may then be received from controller hub 110 in an order corresponding to the order in which the commands are sent.

At block 920, method 900 further includes receiving, by sideband processor 130, data 180 for a particular device (e.g., peripheral device 160a) in computer system 100. Sideband processor 130 is modified to support a second set of commands, in addition to the first set of commands. This modification of sideband processor may be performed by a manufacturer of computer system 100, by a manufacturer of a motherboard included in computer system 100, by an entity that owns and/or operates computer system 100, or by any other qualified entity. The second set of commands, as described above in reference to FIG. 1, may increase a capability of sideband processor 130 to access memory and/or registers of various devices included in computer system 100. The first set of commands utilized for monitoring the operating conditions of computer system 100 may provide limited capability for accessing the memory and registers of the various devices. In some embodiments, the first set of commands may be limited to accessing a specific set values associated with devices that were installed by a manufacturer on a motherboard that is included in computer system 100. By modifying sideband processor 130 to perform the second set of commands, sideband processor 130 may have access to a larger number of devices in computer system 100 and may also have greater access to memory locations included in these devices.

The received data 180 may include more data than is capable of being included in a single one of the commands of the second set of commands. In such cases, sideband processor 130 may divide data 180 into a plurality of portions, each portion to be included in one command of the second set. In addition to, or in place of, dividing data 180 into a plurality of portions, sideband processor 130 may compress all or a portion of data 180 as a technique for including more data into commands of the second set.

Data 180 may be received, by sideband processor 130, from a system administrator via network interface controller 140. Network interface controller 140 may be a different network interface card than is used by primary CPU 103. A system administrator, therefore, may be capable of sending data to one or more devices of computer system 100 from a remote location. This may further allow the system administrator to perform similar tasks on computer systems located at various remote locations.

Method 900, at block 930, includes modifying, by sideband processor 130, a first command of the first set of commands to include a second command of the second set of commands, wherein the second command includes an address associated with peripheral device 160a and at least a portion of data 180. Method 900 includes sending data 180 to peripheral 160a without interfering with the monitoring operation of sideband processor 130. A main function of sideband processor 130 may be to monitor the operating conditions of computer system 100. Accordingly, performance of commands of the second set of commands may be performed in a manner that does not impede performance of commands of the first set. To perform the commands of the second set, sideband processor 130 utilizes commands of the first set, modifying a pending first command of the first set to include information associated with the command of the second set, to be sent to controller hub 110 as a single command, and utilizing the existing communication protocol used for the commands of the first set of commands. The first command may be modified to include the second command using a technique as described above in regards to FIG. 2.

In some embodiments, modifying the first command to include the second command includes using a direct memory access circuit (DMA) of sideband processor 130. For example, the pending first command may be queued in an interface circuit of sideband processor 130. This interface circuit may queue commands to be sent to controller hub 110 via communication bus 117. Sideband processor 130 uses the DMA to send data associated with the second command into the queue of the interface circuit with the first command, storing the data of the second command in a manner that modifies the first command to include the second command. The interface circuit may then treat the modified first command as a single command. In some embodiments, sideband processor may further compress at least a portion of the second command before or while modifying the first command.

At block 940, method 900 includes sending, by sideband processor 130, modified command 114 to controller hub 110 using the particular command protocol over communication bus 117. As stated, the interface circuit of sideband processor 130 may send the modified first command via the particular communication bus. The described sideband technique may exclude primary CPU 103 from processing of the modified first command, thereby reducing or avoiding a performance impact to users of computer system 100 due to the transfer of data 180 from sideband processor 130 to peripheral device 160a.

In some embodiments, the second command causes the portion of data 180 to be stored in system memory 120 of computer system 100. Method 900 may, in such embodiments, include modifying, by sideband processor 130, a third command of the first set of commands, to include a fourth command of the second set of commands, using the technique just described. Sideband processor 130 may then send the modified third command to controller hub 110 using the particular command protocol over communication bus 117. This fourth command, when performed, may cause peripheral device 160a to copy the portion of data 180 from system memory 120.

After performing the first command, controller hub 110 sends, to sideband processor 130 at a first time, a first response to the first command. Similarly, after performing the second command at a second time after the first time, controller hub 110 sends, to sideband processor 130, a second response to the second command. Sideband processor 130 may determine that the second response corresponds to the second command by using an identification value, included in the second response, that corresponds to the second command.

It is noted that method 900 is one example of a method for implementing a sideband command protocol. The method may return to block 910 with sideband processor 130 continuing to monitor the one or more operating conditions. The remainder of method 900 may be repeated in response to receiving another set of data for a particular device in computer system 100. Although four blocks are included in the description of method 900, any suitable number of block may be performed. For example, in other embodiments, additional blocks for dividing data 180 into portions and/or compressing data 180 may be included as a separate block.

Proceeding to FIG. 10, a flowchart of an embodiment of a method for using a sideband command protocol to update an operating system of a computer system is shown. Method 1000 may be performed by a computer system (e.g., computer system 100 in FIGS. 1, 3-5, and 8). In a similar manner as described above, computer system 100 may access a non-transitory, computer-readable medium having program instructions stored thereon that are executable by computer system 100 to cause the operations described in regards to FIG. 10. In some embodiments, method 1000 may utilize one or more operations of method 900 to perform at least a portion of the described operations. Referring collectively to FIGS. 3 and 10, operations of method 1000 begin in block 1010.

At block 1010, method 1000 includes executing, by primary CPU 103 of computer system 100, current OS 325 from system memory 120 coupled to primary CPU 103. Primary CPU 103 has access to system memory 120 and is capable of reading instructions included in current OS 325, as well as other programs that may be stored in system memory 120. Current OS 325 may correspond to any suitable operating system, for example, Windows™ or Linux™.

Method 1000 further includes, at block 1020, receiving, by sideband processor 130 of computer system 100 via network 350, instructions for an updated version of the OS (updated OS 327). Updated OS 327 may be a completely new operating system with different features, may be a new release of current OS 325 with new and/or enhanced features, or may be a patch for a bug fix in current OS 325. In some cases, updated OS 327 may be a roll-back to an older version of current OS 325, for example, to resolve an issue with operation of current OS 325. Updated OS 327 may be received as one or more files for installation in system memory 120.

At block 1030, method 1000 also includes, while primary CPU 103 executes current OS 325, sending, by sideband processor 130 to controller hub 110, a series of modified commands 314 that cause controller hub 110 to store the received instructions into one or more regions of system memory 120. To install updated OS 327, sideband processor 130 sends, to controller hub 110, modified commands 314. As described above, some or all of modified commands 314 may include a corresponding portion of updated OS 327. Each of the portions may be stored in different banks of system memory 120, allowing, in some embodiments, for concurrent writes to system memory 120, thereby reducing an amount of time to complete the installation. As show in regards to FIG. 8, modified commands 314 cause controller hub 110 to perform actions that include installing updated OS 327 into the one or more regions of system memory 120 that are associated with updated OS 327.

Method 1000, at block 1040, further includes causing, by sideband processor 130, primary CPU 103 to switch, without rebooting, from executing current OS 325 to executing updated OS 327. After controller hub 110 has sent responses to sideband processor 130 indicating that all of modified commands 314 have been completed, sideband processor 130 sends an indication to primary CPU 103, indicating that updated OS 327 is installed. In response to this indication, primary CPU 103 may switch, without rebooting, from executing current OS 325 to executing updated OS 327. As described above, primary CPU 103 may be capable of switching execution from current OS 325 to updated OS 327 without performing a reboot of computer system 100. A Linux kexec command, for example, may be used to cause primary CPU 103 to switch to updated OS 327 without rebooting. The kexec command may further enable processes being executed in association with current OS 325 to be executed instead in association with updated OS 327 without performing a reboot.

It is noted that the method illustrated in FIG. 10 is an example. Method 1000 may end after operations of block 1040 complete, or may repeat to install another updated version of the OS. Although shown in a serial order, two or more of the operations of method 1000 may be performed in a different order or in an overlapping manner. For example, operations of block 1020 may continue to be performed (e.g., instructions for the updated version of the OS may continue to be received) while operations of block 1030 are initiated (e.g., the commands for installing the updated version of the OS are sent).

Moving now to FIG. 11, a flowchart of an embodiment of a method for using a sideband command protocol to update a driver of a peripheral device is shown. Method 1100, in a manner such as disclosed above, may be performed by a computer system such as computer system 100 in FIGS. 1, 3-5, and 8. Computer system 100, for example, may access a non-transitory, computer-readable medium having program instructions stored thereon that are executable by computer system 100 to cause the operations described in regards to FIG. 11. In a similar manner as described for method 1000, method 1100 may utilize one or more operations of method 900 to perform at least a portion of the described operations. Referring collectively to FIGS. 5 and 11, method 1100 begins with block 1110.

At block 1110, method 1100 includes executing, by primary CPU 103 of computer system 100, one or more processes. The executed processes may be associated with current OS 325 and/or associated with other programs performed by primary CPU 103. For example, primary CPU 103 may execute processes 630 and 640 shown in FIG. 6. Primary CPU 103 may also utilize one or more of peripheral devices 160 while executing the one or more processes.

Method 1100, at block 1120, includes using, by primary CPU 103, a particular one of peripheral devices 160 coupled to computer system 100, wherein peripheral devices 160 utilize particular versions of respective drivers. The respective drivers enable each of peripheral devices 160 to perform operations associated with each device. Such drivers may have updates made available from time-to-time. These updates, for example, updated driver 467, correct bugs, enhance available features, enable new features, and/or provide other desirable changes from a current driver such as current driver 465.

Method 1100 also includes, at block 1130, receiving via local area network 550, by sideband processor 130 included in computer system 100, instructions for updated driver 467 to replace current driver 465. As illustrated, updated driver 467 is to replace current driver 465 that is currently installed for use by one of peripheral devices 160, e.g., peripheral device 160c. As shown, computer system 100 includes non-volatile memory 570 for storing drivers for any one or more of peripheral devices 160. Sideband processor 130 may receive instructions included in updated driver 467 from local area network 550 via network interface controller 140. For example, a system administrator, using a computer system coupled to local area network 550, may send updated driver 467 to computer system 100 for installation.

At block 1140, method 1100 includes causing, by sideband processor 130, primary CPU 103 to pause use of peripheral device 160c. Sideband processor 130 may notify primary CPU 103 that updated driver 467 is available for installation by, for example, sending the notification via one or more commands to controller hub 110. These one or more commands may cause controller hub 110 to send the notification to primary CPU 103. Sideband processor 130 receives, from primary CPU 103 (e.g., via controller hub 110), an acknowledgement that use of peripheral device 160c has been paused. Sideband processor may begin installation of updated driver 467 in response to receiving this acknowledgement.

At block 1150, method 1100 further includes, while primary CPU 103 executes the one or more processes, sending, by sideband processor 130, a series of modified commands 414 to install the instructions for updated driver 467. Sideband processor 130 sends modified commands 414 to controller hub 110, which in turn, cause controller hub 110 to install updated driver 467 into non-volatile memory 570. In a manner such as described above in regards to FIG. 8, sideband processor 130 may generate modified commands 414 to include a respective portion of the received instructions of updated driver 467. Some or all of modified commands 414 may include a corresponding portion of updated driver 467. As previously disclosed, an identification value may be included in at least some of modified commands 414, and responses from controller hub 110 may include the identification value such that sideband processor 130 may identify a particular one of modified commands 414 that corresponds to a given response from controller hub 110.

Sideband processor 130 may also, after modified commands 414 have been performed, notify peripheral device 160c that updated driver 467 is installed. In response to this notification peripheral device 160c may utilize updated driver 467 to perform the one or more operations associated with the device. In some embodiments, to communicate with peripheral device 160c, sideband processor 130 compiles a communication process, and then sends the compiled communication process to peripheral device 160c thereby enabling communication. Using the compiled communication process, sideband processor 130 sends one or more commands to peripheral device 160c via, in some embodiments, controller hub 110. These one or more commands cause peripheral device 160c to use updated driver 467.

Method 1100, at block 1160, also includes sideband processor 130 notifying primary CPU 103 that peripheral device 160c is available for use. Peripheral device 160c may be unavailable during the installing of updated driver 467. Other ones of peripheral devices 160 may, in some embodiments, remain available for use by primary CPU 103. After the instructions of updated driver 467 have been installed in non-volatile memory 570, peripheral device 160c may be available for use. In some embodiments, updated driver 467 is installed without performing a system reboot, while in other embodiments, a partial reboot is performed to place peripheral device 160c into a known state. After peripheral device 160c is determined to be available, sideband processor 130 sends a notification to primary CPU 103 (e.g., via commands sent to controller hub 110) that peripheral device 160c is available for use.

It is noted that method 1100 of FIG. 11 is merely an example to demonstrate disclosed concepts. Method 1100 may, in some embodiments, repeat to install an updated version of another driver. Two or more of the operations of method 1100 may, in some embodiments, be performed in a different order or in an overlapping manner. For example, operations of block 1130 may continue to be performed while operations of block 1140 are performed, thereby allowing the sideband processor to send a request for the processor to pause use of the peripheral device while continuing to receive instructions for the updated version of the driver.

Exemplary Computer System

Figure 12:
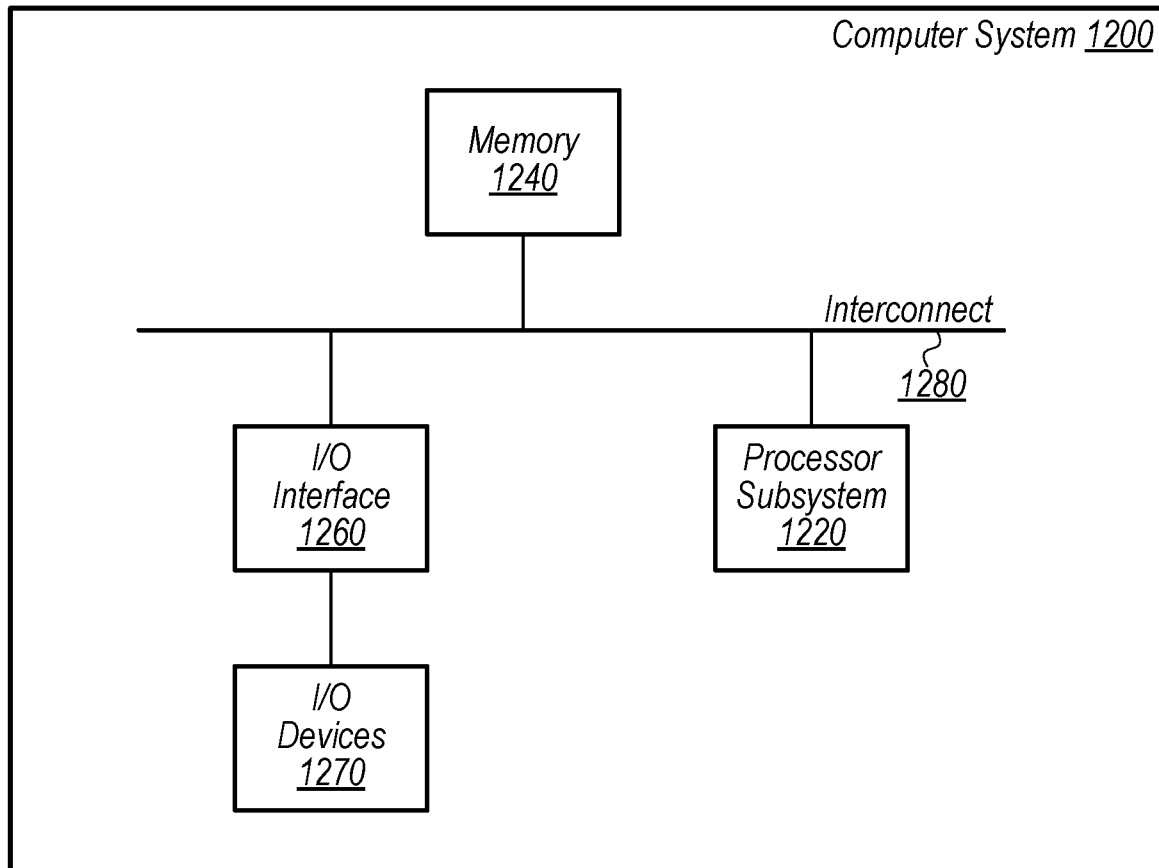
FIG. 12 is a block diagram illustrating an example computer system, according to some embodiments.

Referring now to FIG. 12, a block diagram of an example computer system 1200 is depicted, which may implement one or more computing devices, such as computer system 100 in FIGS. 1, 3-5, and 8. Computer system 1200 includes a processor subsystem 1220 that is coupled to a system memory 1240 and I/O interface(s) 1260 via an interconnect 1280 (e.g., a system bus). I/O interface(s) 1260 is coupled to one or more I/O devices 1270. Computer system 1200 may be any of various types of devices, including, but not limited to, a server computer system, personal computer system, desktop computer, laptop or notebook computer, mainframe computer system, server computer system operating in a datacenter facility, tablet computer, handheld computer, workstation, network computer, etc. Although a single computer system 1200 is shown in FIG. 12 for convenience, computer system 1200 may also be implemented as two or more computer systems operating together.

Processor subsystem 1220 may include one or more processors or processing units, such as primary CPU 103 and, in some embodiments, sideband processor 130 of FIGS. 1, 3, 4-5. In various embodiments of computer system 1200, multiple instances of processor subsystem 1220 may be coupled to interconnect 1280. In various embodiments, processor subsystem 1220 (or each processor unit within 1220) may contain a cache or other form of on-board memory.

System memory 1240 is usable to store program instructions executable by processor subsystem 1220 to cause computer system 1200 to perform various operations described herein. In some embodiments, system memory 1240 corresponds to or includes system memory 120 of FIGS. 1, 3, and 5-8. System memory 1240 may be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 1200 is not limited to primary storage such as system memory 1240. Rather, computer system 1200 may also include other forms of storage such as cache memory in processor subsystem 1220 and secondary storage on I/O devices 1270 (e.g., a hard drive, storage array, etc.). In some embodiments, these other forms of storage may also store program instructions executable by processor subsystem 1220.

I/O interfaces 1260, as illustrated, may be any of various types of interfaces configured to couple to and communicate with other devices. In some embodiments, embodiment, I/O interface 1260 corresponds to controller hub 110 of FIGS. 1, 3-5, and 8. I/O interfaces 1260 may be coupled to one or more I/O devices 1270 via one or more corresponding buses or other interfaces. Examples of I/O devices 1270 include storage devices (hard drive, optical drive, removable flash drive, storage array, SAN, or their associated controller), network interface devices (e.g., network interface controllers 140 and 545 as shown in FIG. 5), or other devices (e.g., graphics, user interface devices, etc.). In one embodiment, I/O devices 1270 includes a network interface device (e.g., configured to communicate over WiFi, Bluetooth, Ethernet, etc.), and computer system 1200 is coupled to a network via the network interface device.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: claim 4 could depend from any of claims 1-3); claim 5 from any preceding claim, and so forth. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A method, comprising:
   monitoring, by a sideband processor, a plurality of operating conditions of a computer system using a first set of commands, wherein the first set of commands are sent utilizing a particular command protocol over a particular communication bus;
   receiving, by the sideband processor, data for a particular device in the computer system, wherein the sideband processor has been modified to support a second set of commands;
   modifying, by the sideband processor, a first command of the first set of commands to include a second command of the second set of commands, wherein the second command includes an address associated with the particular device and at least a portion of the data;
   sending, by the sideband processor, the modified first command to a controller hub using the particular command protocol over the particular communication bus;
   at a first time, the sideband processor receiving a response to the first command from the controller hub; and
   at a second time after the first time, the sideband processor receiving a response to the second command from the controller hub.

2. The method of claim 1, wherein the second command includes an identification value, and wherein receiving the response to the second command include determining that the response corresponds to the second command using the identification value.

3. The method of claim 1, further comprising sending the first command via an interface circuit to the particular communication bus, wherein modifying the first command to include the second command includes using a direct memory access circuit of the sideband processor to send the second command to the interface circuit during the sending of the first command.

4. The method of claim 1, further comprising compressing, by the sideband processor, at least a portion of the second command.

5. The method of claim 1, wherein the second command causes the portion of the data for the particular device to be stored in a system memory of the computer system.

6. The method of claim 5, further comprising sending, by the sideband processor, the received data to the particular device by:
   modifying, by the sideband processor, a third command of the first set of commands, to include a fourth command of the second set of commands, wherein the fourth command causes the particular device to copy the portion of the data from the system memory; and
   sending, by the sideband processor, the modified third command to the controller hub using the particular command protocol over the particular communication bus.

7. The method of claim 1, wherein a primary central processing unit (CPU) of the computer system is excluded from processing of the modified first command.

8. The method of claim 7, wherein receiving the data for the particular device includes receiving, by the sideband processor, the data from a system administrator via a first network interface card that is different than a second network interface card used by the primary CPU.

9. An apparatus, including:
   a communication bus configured to support a particular command protocol;
   a controller hub coupled to a primary central processing unit (CPU) and to one or more peripheral devices, wherein the controller hub is coupled to the communication bus and is configured to receive a first set of commands using the particular command protocol;
   a sideband processor coupled to the communication bus and configured to:
   send, via the communication bus, a series of commands of the first set of commands to monitor one or more operating conditions of the apparatus;
   receive, via a network interface, data for a particular peripheral device of the one or more peripheral devices;
   modify a pending particular command of the series of commands, to include a subsidiary command of a second set of commands, wherein the subsidiary command includes an address associated with the particular peripheral device and at least a portion of the data; and
   send, via the communication bus, the modified command to the controller hub using the particular command protocol; and receive, at different times, separate responses to the particular and subsidiary commands from the controller hub.

10. The apparatus of claim 9, wherein the sideband processor is further configured to:
    at a first time, receive a first response to the particular command from the controller hub; and
    at a second time after the first time, receive a second response to the subsidiary command from the controller hub.

11. The apparatus of claim 10, wherein the sideband processor is further configured to:
    include an identification value in the subsidiary command; and
    determine that the second response corresponds to the subsidiary command using the identification value.

12. The apparatus of claim 9, further including a system memory, wherein the subsidiary command causes the portion of the data to be stored in the system memory.

13. The apparatus of claim 12, wherein the sideband processor is further configured to:
    modify a pending different command of the first set of commands, to include a different subsidiary command of the second set of commands, wherein the different subsidiary command causes the particular peripheral device to copy the portion of the data from the system memory; and
    send, via the communication bus, the modified different command to the controller hub using the particular command protocol.

14. The apparatus of claim 12, wherein the portion of the data is stored in the system memory without utilizing bandwidth of the primary CPU.

15. A non-transitory computer-readable medium having instructions stored thereon that are executable by a sideband processor, included in a computer system, to perform operations comprising:
    monitoring a plurality of operating conditions of the computer system using a first set of commands, wherein the first set of commands are sent utilizing a particular command protocol over a communication bus;
    receiving data for a particular device in the computer system;
    modifying a first command of the first set of commands, to include a second command of a second set of commands, different from the first set of commands, wherein the second command causes at least a portion of the data to be sent to the particular device, and wherein the modified first command includes the first command and the second command; and
    sending, via an interface circuit, the modified first command to a controller hub using the particular command protocol over the communication bus.

16. The non-transitory computer-readable medium of claim 15, further comprising:
    at a first time, receiving a response to the first command from the controller hub; and
    at a second time after the first time, receiving a response to the second command from the controller hub.

17. The non-transitory computer-readable medium of claim 15, wherein modifying the first command to include the second command includes sending the second command to the interface circuit during the sending of the first command.

18. The non-transitory computer-readable medium of claim 15, further comprising generating the second command to cause the portion of the data to be stored in a system memory of the computer system.

19. The non-transitory computer-readable medium of claim 18, further comprising:
    modifying a third command of the first set of commands, to include a fourth command of the second set of commands, wherein the fourth command causes the particular device to copy the portion of the data from the system memory; and
    send, via the communication bus, the modified third command to the controller hub using the particular command protocol.

* * * * *